United States Patent
Xiong

(10) Patent No.: US 12,191,531 B1
(45) Date of Patent: Jan. 7, 2025

(54) ENERGY STORAGE DEVICE, WELDING METHOD FOR ENERGY STORAGE DEVICE, AND ELECTRICITY-CONSUMPTION DEVICE

(71) Applicants: Shenzhen Hithium Energy Storage Technology Co., Ltd., Shenzhen (CN); Xiamen Hithium Energy Storage Technology Co., Ltd., Fujian (CN)

(72) Inventor: Yongfeng Xiong, Shenzhen (CN)

(73) Assignees: Shenzhen Hithium Energy Storage Technology Co., Ltd., Shenzhen (CN); Xiamen Hithium Energy Storage Technology Co., Ltd., Fujian (CN)

(*) Notice: Subject to any disclaimer, the term of this patent is extended or adjusted under 35 U.S.C. 154(b) by 0 days.

(21) Appl. No.: 18/733,560

(22) Filed: Jun. 4, 2024

(30) Foreign Application Priority Data

Jun. 14, 2023 (CN) .......................... 202310702424.1

(51) Int. Cl.
*H01M 50/00* (2021.01)
*B23K 26/21* (2014.01)
(Continued)

(52) U.S. Cl.
CPC ........... *H01M 50/536* (2021.01); *B23K 26/21* (2015.10); *H01M 10/0431* (2013.01);
(Continued)

(58) Field of Classification Search
CPC ............ H01M 4/64; H01M 4/78; H01M 4/88; H01M 50/30; H01M 50/342;
(Continued)

(56) References Cited

U.S. PATENT DOCUMENTS

| 2008/0166630 A1 | 7/2008 | Okabe et al. |
| 2011/0183196 A1 | 7/2011 | Suzuki et al. |
| 2023/0048125 A1 | 2/2023 | Su et al. |

FOREIGN PATENT DOCUMENTS

| CN | 108054302 A | 5/2018 |
| CN | 216624504 U | 5/2022 |

(Continued)

OTHER PUBLICATIONS

Xiong, Collecting Component, Energy Storage Device And Electric Device, May 2023, See the Abstract. (Year: 2023).*

(Continued)

*Primary Examiner* — Anca Eoff
*Assistant Examiner* — Monique M Wills
(74) *Attorney, Agent, or Firm* — IP SPRING

(57) ABSTRACT

This disclosure provides an energy storage device, a welding method for an energy storage device, and an electricity-consumption device. The energy storage device includes an end cap, a housing, and a current collector arranged between the end cap and the housing. The current collector includes a main body and a welding portion, and the main body and the welding portion are integrally formed. The main body has a first surface and a second surface facing away from the first surface. The end cap is connected to the first surface of the main body, the housing is connected to the second surface of the main body, and the welding portion is connected to an outer peripheral side surface of the end cap, an outer peripheral side surface of the housing, and an outer peripheral side surface of the main body.

20 Claims, 15 Drawing Sheets

(51) Int. Cl.
  *H01M 10/04* (2006.01)
  *H01M 50/107* (2021.01)
  *H01M 50/152* (2021.01)
  *H01M 50/533* (2021.01)
  *H01M 50/536* (2021.01)
  *H01M 50/627* (2021.01)

(52) U.S. Cl.
  CPC ....... *H01M 50/107* (2021.01); *H01M 50/152* (2021.01); *H01M 50/533* (2021.01); *H01M 50/627* (2021.01)

(58) Field of Classification Search
  CPC ... H01M 50/147; H01M 50/169; Y02E 60/10; Y02E 2220/10
  See application file for complete search history.

(56) References Cited

FOREIGN PATENT DOCUMENTS

| CN | 114678600 | A |   | 6/2022  |          |
|----|-----------|---|---|---------|----------|
| CN | 216872214 | U |   | 7/2022  |          |
| CN | 216903064 | U |   | 7/2022  |          |
| CN | 115188968 | A |   | 10/2022 |          |
| CN | 115275464 | A |   | 11/2022 |          |
| CN | 115295860 | A |   | 11/2022 |          |
| CN | 115347328 | A |   | 11/2022 |          |
| CN | 218123567 | U |   | 12/2022 |          |
| CN | 218299980 | U |   | 1/2023  |          |
| CN | 115842200 | A |   | 3/2023  |          |
| CN | 218602689 | U |   | 3/2023  |          |
| CN | 115911689 | A |   | 4/2023  |          |
| CN | 116154183 | A | * | 5/2023  | ............ H01M 4/70 |
| CN | 116190673 | A |   | 5/2023  |          |

OTHER PUBLICATIONS

CNIPA, Notice of Allowance for corresponding Chinese Patent Application No. 202310702424.1, Jul. 26, 2023, 8 pages.
CNIPA, International Search Report for International Patent Application No. PCT/CN2024/073425, Apr. 9, 2024, 20 pages.
CNIPA, Written Opinion for International Patent Application No. PCT/CN2024/073425, Apr. 9, 2024, 9 pages.

* cited by examiner

ENERGY STORAGE DEVICE, WELDING METHOD FOR ENERGY STORAGE DEVICE, AND ELECTRICITY-CONSUMPTION DEVICE

CROSS-REFERENCE TO RELATED APPLICATION(S)

This application claims priority under 35 U.S.C. § 119 (a) to and the benefit of Chinese Patent Application No. 202310702424.1, filed Jun. 14, 2023, the entire disclosure of which is incorporated herein by reference.

TECHNICAL FIELD

The disclosure relates to the field of energy storage technologies, and in particular to an energy storage device, a welding method for an energy storage device, and an electricity-consumption device.

BACKGROUND

A secondary cell, also known as a rechargeable cell or a storage cell, refers to a cell that can be charged after discharge to activate active substance of the cell for reuse. Since the secondary cell is reusable, the secondary cell gradually becomes a main power source for electricity-consumption devices. As the demand for the secondary cell gradually increases, people have increasingly higher requirements for various performances of the secondary cell, especially for the energy density per unit volume of the cell. However, for a cylindrical secondary cell, a gap defined between a wound electrode assembly and an end cap at one side of the cell and a gap defined between the wound electrode assembly and an end cap at the other side of the cell are key factors for restricting the energy density per unit volume of the cell.

SUMMARY

The disclosure provides an energy storage device, a welding method for an energy storage device, and an electricity-consumption device.

In a first aspect of the disclosure, an energy storage device is provided. The energy storage device includes an end cap, a housing, and a current collector arranged between the end cap and the housing. An outer peripheral side surface of the end cap is flush with an outer peripheral side surface of the housing. The current collector includes a main body and a welding portion. The main body and the welding portion are integrally formed. The main body has a first surface and a second surface facing away from the first surface. The end cap is connected to the first surface of the main body, the housing is connected to the second surface of the main body, and the welding portion is connected to the outer peripheral side surface of the end cap, the outer peripheral side surface of the housing, and an outer peripheral side surface of the main body. The current collector satisfies one of the following: the outer peripheral side surface of the main body is flush with both the outer peripheral side surface of the end cap and the outer peripheral side surface of the housing, in a radial direction of the current collector; and the outer peripheral side surface of the main body protrudes from both the outer peripheral side surface of the end cap and the outer peripheral side surface of the housing, in the radial direction of the current collector. The welding portion protrudes from the end cap by a width L1, where the width L1 satisfies: 0.05 mm≤L1≤1.45 mm; and the welding portion protrudes from the housing by a width L2, where the width L2 satisfies: 0.05 mm≤L2≤1.45 mm.

In a second aspect of the disclosure, an electricity-consumption device is provided. The electricity-consumption device includes a device body and the energy storage device provided in the first aspect of the disclosure, where the energy storage device is configured to power the device body.

In a third aspect of the disclosure, a welding method for an energy storage device is provided. The welding method includes the following. Provide an end cap, a housing, and a current collector. Make the end cap abut against a surface of the current collector and make the housing abut against a surface of the current collector facing away from the end cap, and expose an outer peripheral side surface of the current collector. Perform circumferential laser welding on an outer peripheral side of the current collector to fixedly connect the current collector to both the end cap and the housing, where the current collector subject to the welding includes a main body and a welding portion. The main body and the welding portion are integrally formed. The main body has a first surface and a second surface facing away from the first surface, the end cap is connected to the first surface of the main body, and the housing is connected to the second surface of the main body. The welding portion is connected to an outer peripheral side surface of the end cap, an outer peripheral side surface of the housing, and an outer peripheral side surface of the main body. The outer peripheral side surface of the end cap is flush with the outer peripheral side surface of the housing. The current collector satisfies one of the following: the outer peripheral side surface of the main body is flush with both the outer peripheral side surface of the end cap and the outer peripheral side surface of the housing, in a radial direction of the current collector; and the outer peripheral side surface of the main body protrudes from both the outer peripheral side surface of the end cap and the outer peripheral side surface of the housing, in the radial direction of the current collector. The welding portion protrudes from the end cap by a width L1, where the width L1 satisfies: 0.05 mm≤L1≤1.45 mm; and the welding portion protrudes from the housing by a width L2, where the width L2 satisfies: 0.05 mm≤L2≤1.45 mm.

BRIEF DESCRIPTION OF THE DRAWINGS

In order to describe technical solutions in embodiments of the disclosure more clearly, the following will give an introduction to the accompanying drawings required for describing embodiments of the disclosure.

Figure 1:
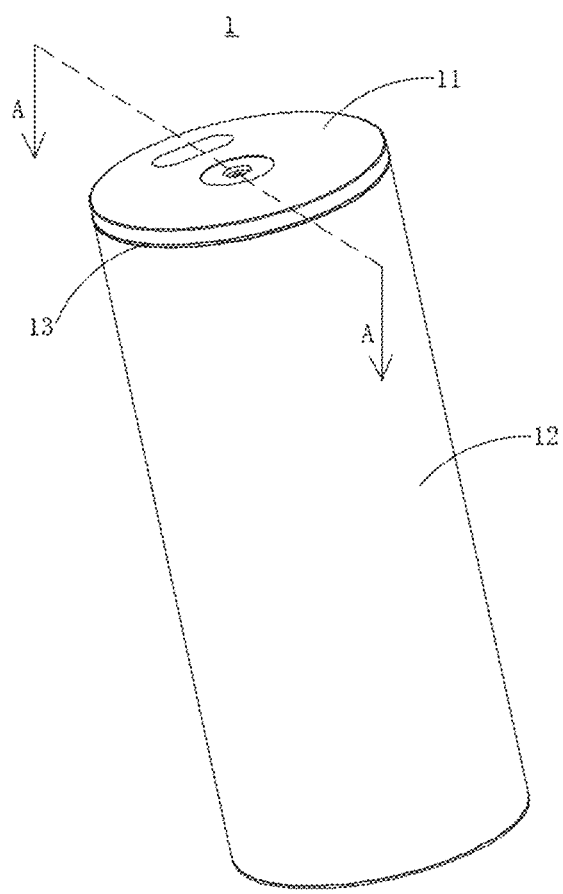
FIG. 1 is a schematic structural view of an energy storage device provided in an embodiment of the disclosure.

Illustration of reference signs: energy storage device—1; end cap—11; explosion-proof valve—111; second liquid-injection hole—112; first portion—113; second portion—114; cavity—115; housing—12; accommodating cavity—121; current collector—13; main body—131; first surface—131a; second surface—131b; welding portion—132; first liquid-injection hole—133; first positioning portion—134; first top surface—1341; first side surface—1342; positioning protrusion—1343; positioning convex ring—1344; first through hole—135; limiting protrusion—136; second top surface—1361; second side surface—1362; second through hole—137; second positioning portion—138; electrode assembly—14; hollow structure—141; electricity-consumption device—2; device body—21.

DETAILED DESCRIPTION

The following are exemplary embodiments of the disclosure. It may be noted that, for those of ordinary skill in the art, modifications and improvements may be made within the principles of the disclosure, and these modifications and improvements may be included in the scope of protection of the disclosure.

Currently, for a cylindrical secondary cell, to shorten a gap between a positive end cap and a wound electrode assembly, a conventional connection manner in which a bendable connector extending from a side of a current collector is welded to a terminal post on the end cap is discarded, and a manner in which a positive current collector is directly welded to the positive end cap is adopted to further reduce the gap between the positive end cap and the wound electrode assembly.

In general, a protrusion is provided on the current collector, and the end cap is welded to the protrusion. However, this kind of connection still brings the following problems. Firstly, a welding region between the current collector and the end cap includes merely a periphery of the protrusion and a part of the end cap corresponding to the periphery of the protrusion. In this case, an actual electrical connection region between the positive current collector and the positive end cap is relatively small, which is a bottleneck for improving a current-flow through capability (i.e., a capability of allowing current to flow through) of a current path between the wound electrode assembly and the positive end cap. During normal use, since the welding region between the end cap and the current collector is relatively small, the resistance in the welding region is relatively high. Therefore, in the case where current converges in the welding region, it is easy to generate heat, resulting in a low strength of connection between the end cap and the current collector.

Secondly, in a random dropping experiment for the cell, a negative electrode of the cell may hit the ground occasionally. In this case, the wound electrode assembly inside the cell may drive the positive current collector to move away from the positive end cap under the action of inertia, then the positive current collector is pulled away from the positive end cap, resulting in small cracks in the welding region. In subsequent electrical experiments or normal use, the cell is prone to liquid leakage.

Embodiments of the present disclosure provide an energy storage device to solve the above problems.

Figure 2:
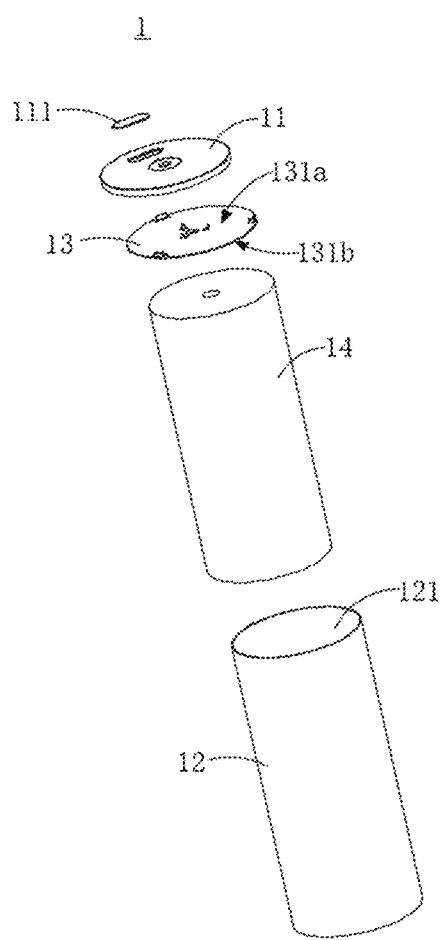
FIG. 2 is a structural exploded view of an energy storage device provided in an embodiment of the disclosure.
Figure 3:
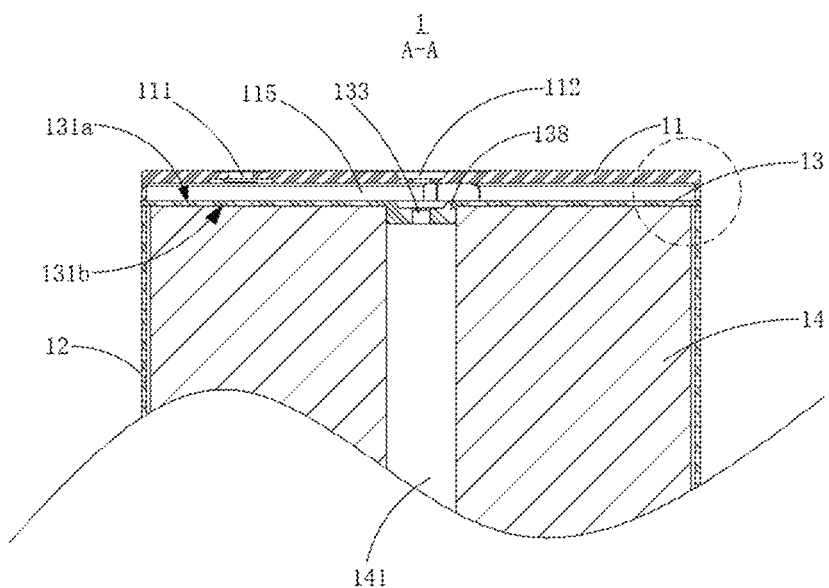
FIG. 3 is cross-sectional view 1 of the embodiment of FIG. 1, taken along line A-A.
Figure 4:
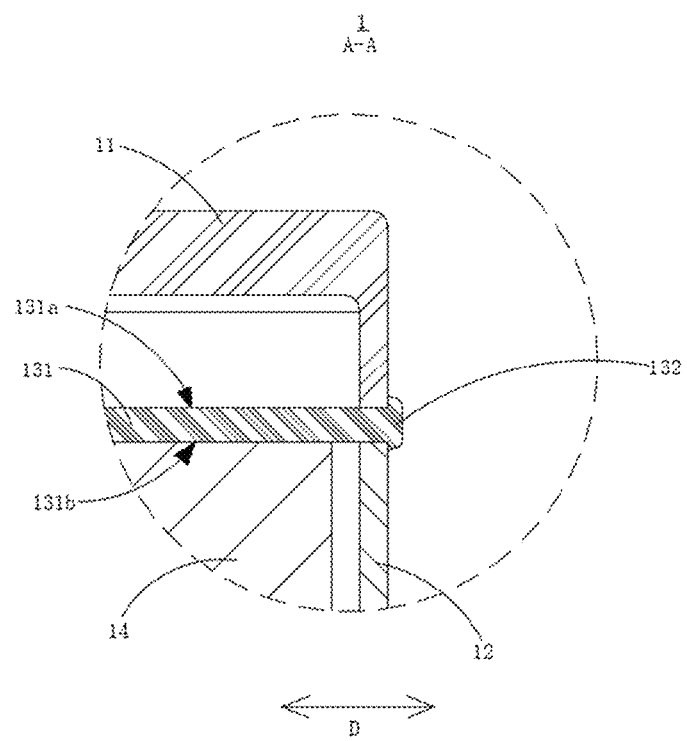
FIG. 4 is a partially enlarged view 1 of FIG. 3.
Figure 5:
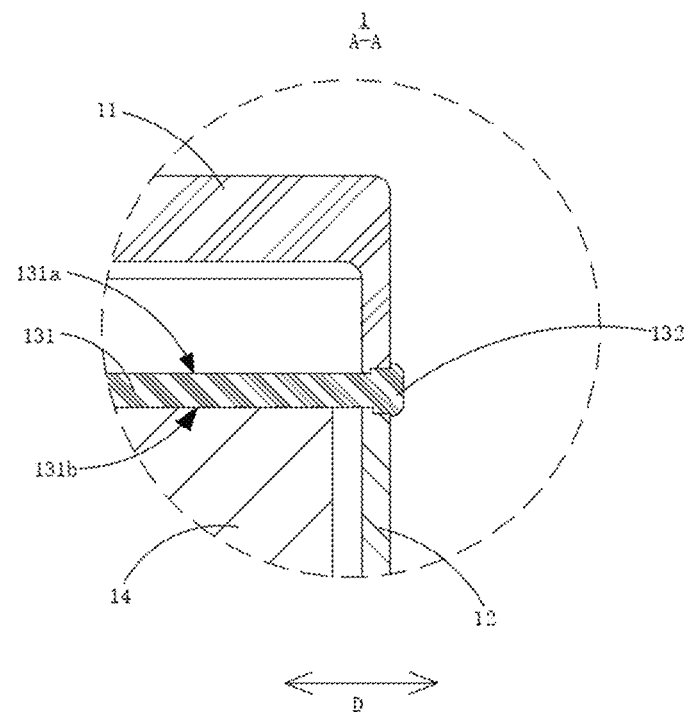
FIG. 5 is a partially enlarged view 2 of FIG. 3.
Figure 6:
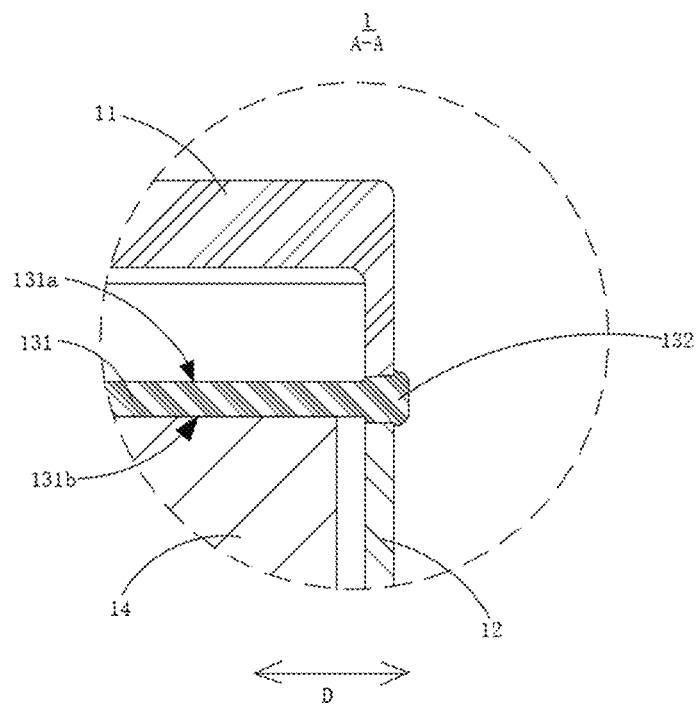
FIG. 6 is a partially enlarged view 3 of FIG. 3.
Figure 7:
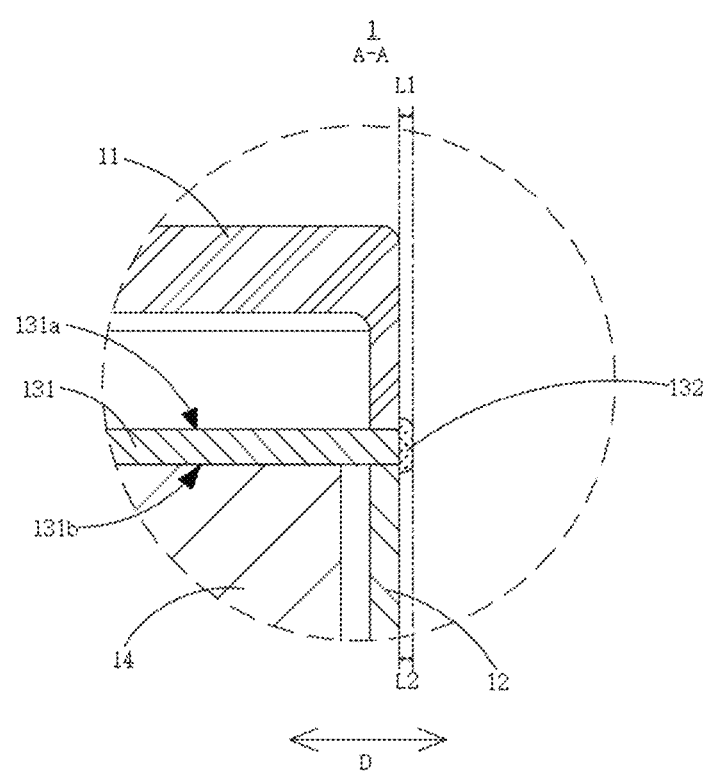
FIG. 7 is a partially enlarged view 4 of FIG. 3.
Figure 8:
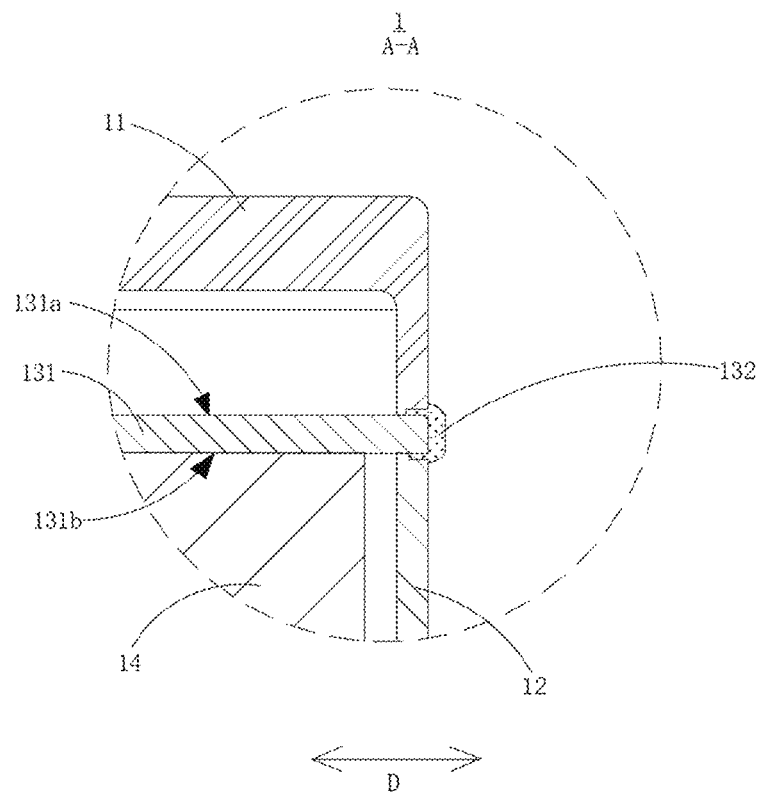
FIG. 8 is a partially enlarged view 5 of FIG. 3.
Figure 9:
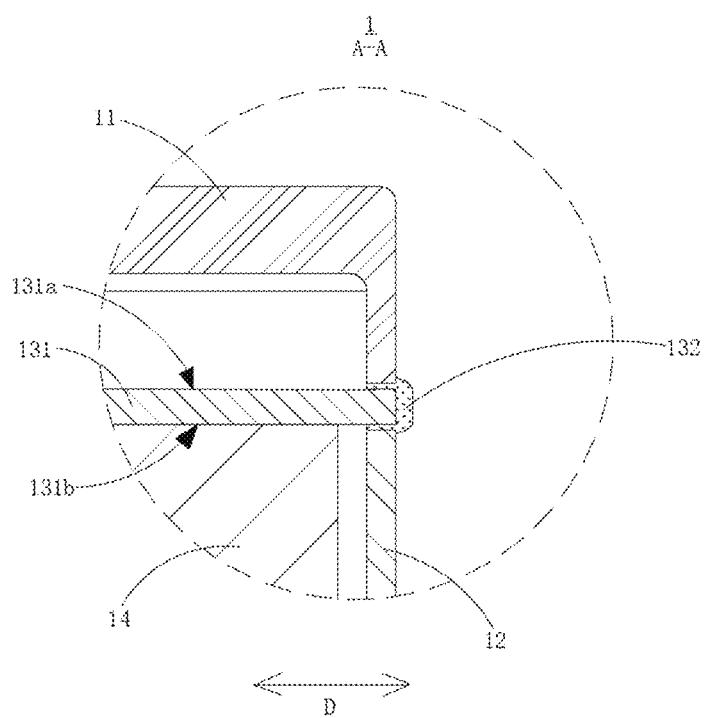
FIG. 9 is a partially enlarged view 6 of FIG. 3.

Reference is made to FIG. 1 to FIG. 9. FIG. 1 is a schematic structural view of an energy storage device provided in an embodiment of the disclosure. FIG. 2 is a structural exploded view of an energy storage device provided in an embodiment of the disclosure. FIG. 3 is cross-sectional view 1 of the embodiment of FIG. 1, taken along line A-A. FIG. 4 is a partially enlarged view 1 of FIG. 3. FIG. 5 is a partially enlarged view 2 of FIG. 3. FIG. 6 is a partially enlarged view 3 of FIG. 3. FIG. 7 is a partially enlarged view 4 of FIG. 3. FIG. 8 is a partially enlarged view 5 of FIG. 3. FIG. 9 is a partially enlarged view 6 of FIG. 3.

An energy storage device 1 is provided in the disclosure. A current collector 13 of the energy storage device 1 is welded to both a peripheral side surface of an end cap 11 and a peripheral side surface of a housing 12, so that a strength of connection among the end cap 11, the current collector 13, and the housing 12 may be improved. Optionally, the energy storage device 1 may be but is not limited to a lithium-ion secondary cell, a lithium-ion primary cell, a lithium sulfur cell, a sodium lithium-ion cell, a sodium-ion cell, a magnesium-ion cell, etc.

The energy storage device 1 provided in the embodiment includes the end cap 11, the housing 12, and the current collector 13 arranged between the end cap 11 and the housing 12. The current collector 13 includes a main body 131 and a welding portion 132. The main body 131 and the welding portion 132 are integrally formed. The main body 131 has a first surface 131a and a second surface 131b facing away from the first surface 131a. The end cap 11 is connected to the first surface 131a of the main body 131, and the housing 12 is connected to the second surface 131b of the main body 131. The welding portion 132 is connected to an outer peripheral side surface of the end cap 11, an outer peripheral side surface of the housing 12, and an outer peripheral side surface of the main body 131.

In addition, the terms "include" and "comprise", as well as variations thereof are intended to cover non-exclusive inclusion. The terms "first", "second" and the like in the specification, the claims, and the accompanying drawings of the disclosure are used to distinguish different objects rather than describe a particular order.

The energy storage device 1 provided in the embodiment includes the end cap 11, where the end cap 11 is electrically connected to the current collector 13, and is used to fix and protect other components. The end cap 11 is connected to the current collector 13. For example, the end cap 11 is partially welded to the current collector 13. For another example, the end cap 11 partially abuts against the current collector 13. Optionally, the end cap 11 may be but is not limited to circular, rectangular, cap-shaped, etc. Optionally, the end cap 11 may be a positive end cap 11 or a negative end cap 11.

Optionally, the end cap 11 includes an explosion-proof valve 111. The explosion-proof valve 111 is used to exhaust gas generated inside the energy storage device 1 to prevent explosion, thereby improving the safety of the energy storage device 1. Optionally, the end cap 11 includes a second liquid-injection hole 112 for injection of electrolyte. Optionally, the second liquid-injection hole 112 is defined on the center of the end cap 11.

The energy storage device 1 provided in the embodiment further includes the housing 12. The housing 12 is used to accommodate, fix, and protect other components. The housing 12 is connected to the current collector 13. For example, the housing 12 is partially welded to the current collector 13. For another example, the housing 12 partially abuts against the current collector 13. Optionally, a material of the housing 12 may be a metal material such as aluminum, copper, or alloy. Optionally, the housing 12 may be but is not limited to circular, rectangular, etc. Optionally, the shape of the housing 12 is matched with the shape of the end cap 11, or the housing 12 has the same shape as the end cap 11. Optionally, the energy storage device 1 further includes an electrode assembly 14. The housing 12 defines an accommodating cavity 121, and the electrode assembly 14 is arranged in the accommodating cavity 121.

The energy storage device 1 provided in the embodiment further includes the current collector 13. The current collector 13 is electrically connected to the end cap 11, the housing 12, and the electrode assembly 14. The end cap 11 is welded to a surface of the current collector 13, and the housing 12 is welded to another surface of the current collector 13 facing away from the end cap 11. The current collector 13 includes the main body 131 and the welding portion 132, and the main body 131 and the welding portion 132 are integrally formed. The main body 131 may be understood as a portion of the current collector 13 that is not changed before and after welding. The welding portion 132 may be understood as a portion of the current collector 13 welded to both the end cap 11 and the housing 12, formed after the current collector 13 is subject to welding. That is, the welding portion 132 is a welding seam formed by cooling and solidification of a molten metal after welding. Optionally, an outer side surface of the main body 131 and an outer side surface of the welding portion 132 may both be a flat surface or a curved surface, which is not limited in the disclosure.

It may be noted that, in order to more clearly indicate the main body 131 and the welding portion 132, the main body 131 and the welding portion 132 are marked with different patterns in FIG. 7 to FIG. 9. However, in actual production, the main body 131 and the welding portion 132 are integrally formed, as illustrated in FIG. 4 to FIG. 6. As illustrated in FIG. 7 to FIG. 9, the first surface 131*a* of the main body 131 is connected to the end cap 11. At least part of the end cap 11 abuts against the first surface 131*a* of the main body 131. For example, a surface of the end cap 11 facing the current collector 13 abuts against the first surface 131*a*. For another example, since part of a solder flows to a position between the main body 131 and the end cap 11, a part of the surface of the end cap 11 facing the current collector 13 abuts against the first surface 131*a*, and another part of the surface of the end cap 11 facing the current collector 13 abuts against the welding portion 132. At least part of the housing 12 abuts against the second surface 131*b* of the main body 131. For example, a surface of the housing 12 facing the current collector 13 abuts against the second surface 131*b*. For another example, since part of a solder flows to a position between the main body 131 and the housing 12, a part of the surface of the housing 12 facing the current collector 13 abuts against the second surface 131*b*, and another part of the surface of the housing 12 facing the current collector 13 abuts against the welding portion 132.

The welding portion 132 is connected to the outer peripheral side surface of the main body 131, and the outer peripheral side surface of the main body 131 is connected to both the first surface 131*a* and the second surface 131*b*. The welding portion 132 is further connected to both the end cap 11 and the housing 12. For example, the welding portion 132 is connected to an outer peripheral side of the housing 12. For another example, the welding portion 132 is connected to an outer peripheral side of the end cap 11. For another example, the welding portion 132 is connected to the surface of the housing 12 facing the current collector 13. For another example, the welding portion 132 is connected to the surface of the end cap 11 facing the current collector 13.

It may be understood that, the welding portion 132 is the portion of the current collector 13 that is welded to the end cap 11 and the housing 12, formed after the current collector 13 is subject to welding, and thus the welding portion 132 may be connected to the end cap 11 and the housing 12 in various ways. The above mentioned connection between the welding portion 132 and the end cap 11 and between the welding portion 132 and the housing 12 may exist either alone or in various combinations with each other.

It may be understood that, the current collector 13 in the embodiment does not include a protrusion structure facing the end cap 11. The protrusion structure herein is a protrusion that is used for welding the current collector 13 to the end cap 11 in the related art. Optionally, the current collector 13 defines a first liquid-injection hole 133 for injection of electrolyte. Further, optionally, the first liquid-injection hole 133 is defined on the center of the current collector 13. Further, optionally, the first liquid-injection hole 133 is arranged opposite to the second liquid-injection hole 112.

Optionally, the current collector 13 may be but is not limited to circular, rectangular, and the like. Optionally, the current collector 13, the housing 12, and the end cap 11 are matched with each other in shape. In other words, the current collector 13, the housing 12, and the end cap 11 have the same shape. Optionally, the current collector 13 is a positive current collector 13 or a negative current collector 13. For example, in the case where the end cap 11 is a positive end cap 11, the current collector 13 is the positive current collector 13; in the case where the end cap 11 is a negative end cap 11, the current collector 13 is the negative current collector 13.

Firstly, in the embodiment, the end cap 11 is connected to the first surface 131*a* of the main body 131, the housing 12 is connected to the second surface 131*b* of the main body 131, the welding portion 132 is connected to the outer peripheral side surface of the main body 131, the end cap 11, and the housing 12, and the welding portion 132 is connected to the peripheral side surface of the end cap 11 and the peripheral side surface of the housing 12. In other words, a welding region between the end cap 11 and the current collector 13 includes the welding portion 132 of the current collector 13 around the peripheral side surface of the end cap 11, and a portion of the outer peripheral side surface of the end cap 11 corresponding to the welding portion 132. It may also be understood that, the electrical connection region between the end cap 11 and the current collector 13 is expanded to include an outer-diameter portion of the end cap 11. In this way, the welding region between the end cap 11 and the current collector 13 is enlarged and the electrical connection region for the end cap 11 and the current collector 13 is enlarged, so that a current-flow through capability (i.e., a capability of allowing current to flow through) between the end cap 11 and the current collector 13 may be improved, thereby reducing or even avoiding easy-heating in the case where current converges in the welding region, and accordingly improving the strength of connection between the end cap 11 and the current collector 13. The current-flow through capability between the end cap 11 and the current collector 13 refers to a current-flow through capability of a current path between the end cap 11 and the current collector 13.

It is to be noted that, the housing 12 has two dimensions in a radial direction, where one is a distance between two opposite positions of an outer peripheral side wall of the housing 12 (i.e., the outer diameter) and the other is a distance between two opposite positions of an inner peripheral side wall of the housing 12 (i.e., the inner diameter). The same understanding may be given to the outer and inner diameters referred to hereinafter in the disclosure, which will not be repeated in the disclosure.

Further, the current collector 13 provided in the embodiment is arranged between and welded to the end cap 11 and the housing 12, the main body 131 is connected to both a surface of the end cap 11 facing the housing 12 and a surface of the housing 12 facing the end cap 11, and the welding portion 132 is connected to the peripheral side surface of the end cap 11 and the peripheral side surface of the housing 12. In the case where the energy storage device 1 falls, the current collector 13 tends to move away from the end cap 11 under the action of inertia. However, since the main body 131 is connected to the housing 12, i.e., the main body 131 abuts against the housing 12, the current collector 13 may be prevented from moving in a direction away from the end cap 11 by abutting against the housing 12 under the action of the structural strength of the current collector 13, thereby further improving the strength of connection among the current collector 13, the housing 12, and the end cap 11, in other words, improving the structural strength among the current collector 13, the housing 12, and the end cap 11, and thus reducing the possibility of liquid leakage.

For example, in a random dropping experiment of a cell, in the case where a negative electrode of the cell hits the ground, and the wound electrode assembly 14 inside the cell drives the positive current collector 13 to move away from the positive end cap 11 under the action of inertia, since the positive current collector 13 directly abuts against the housing 12, the positive current collector 13 may be prevented from further moving towards the ground by abutting against the housing 12 under the action of the structural strength of the positive current collector 13. In this way, the structural strength of the welding region among the current collector 13, the housing 12, and the end cap 11 is further improved.

In the energy storage device 1 in the embodiments, the current collector 13 is arranged between the end cap 11 and the housing 12 and is welded to the peripheral side surface of the end cap 11 and the peripheral side surface of the housing 12, and thus the welding region between the end cap 11 and the current collector 13 may be enlarged, thereby improving the current-flow through capability between the end cap 11 and the current collector 13, and accordingly improving the strength of connection among the end cap 11, the current collector 13, and the housing 12.

Figure 10:
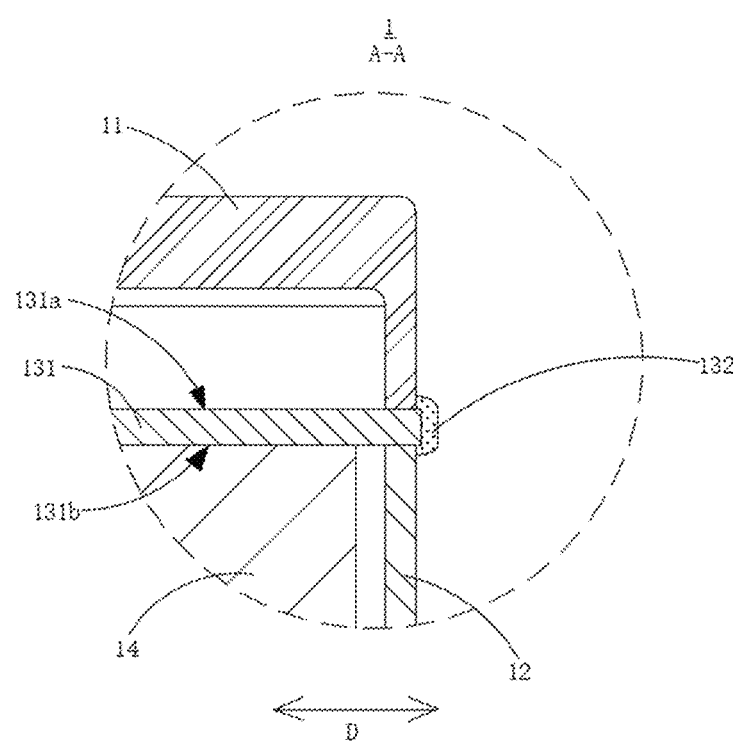
FIG. 10 is a partially enlarged view 7 of FIG. 3.
Figure 11:
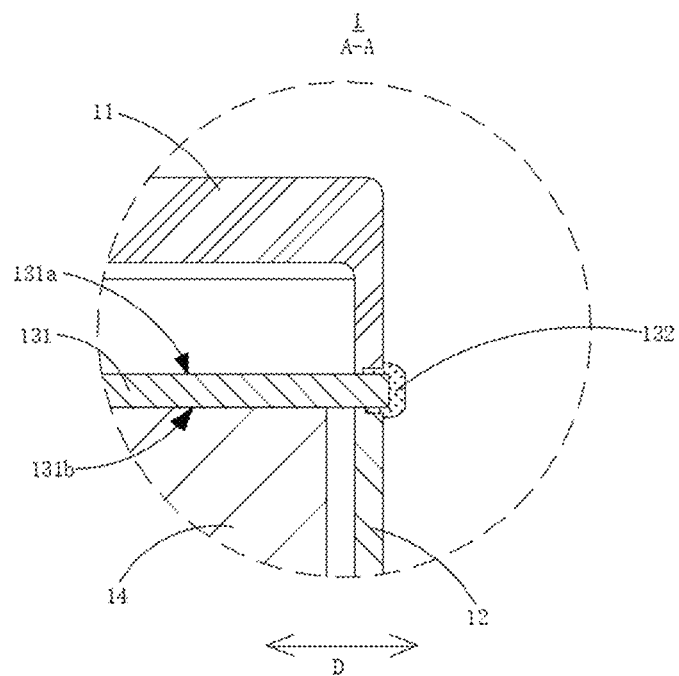
FIG. 11 is a partially enlarged view 8 of FIG. 3.
Figure 12:
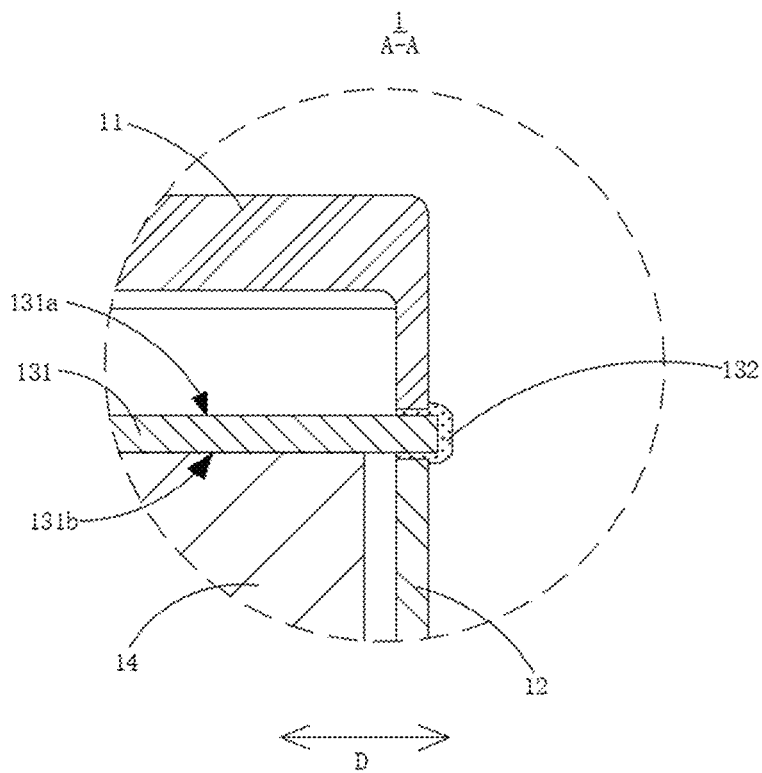
FIG. 12 is a partially enlarged view 9 of FIG. 3.
Figure 13:
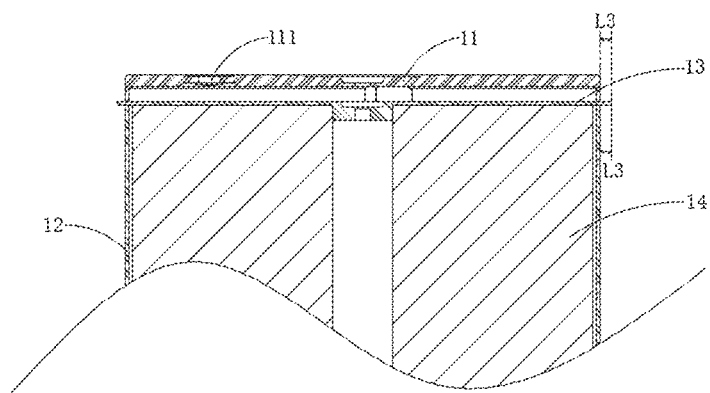
FIG. 13 is a cross-sectional view of a current collector, an end cap, and a housing provided in the embodiment of FIG. 1, taken along line A-A, the current collector, the end cap, and the housing being not welded together.

Reference is made to FIG. 1 to FIG. 13. FIG. 10 is a partially enlarged view 7 of FIG. 3. FIG. 11 is a partially enlarged view 8 of FIG. 3. FIG. 12 is a partially enlarged view 9 of FIG. 3. FIG. 13 is a cross-sectional view of a current collector, an end cap, and a housing provided in the embodiment of FIG. 1, taken along line A-A, the current collector, the end cap, and the housing being not welded together. It may be noted that, in order to more clearly indicate the main body 131 and the welding portion 132, the main body 131 and the welding portion 132 are marked with different patterns in FIG. 7 to FIG. 12. However, in actual production, the main body 131 and the welding portion 132 are integrally formed, as illustrated in FIG. 4 to FIG. 6.

In an embodiment, the current collector 13 satisfies one of the following: the outer peripheral side surface of the main body 131 is flush with the outer peripheral side surface of the end cap 11 and/or the outer peripheral side surface of the main body 131 is flush with the outer peripheral side surface of the housing 12, in a radial direction of the current collector 13 (direction D in FIG. 7); and the outer peripheral side surface of the main body 131 protrudes from the outer peripheral side surface of the end cap 11 and/or the outer peripheral side surface of the housing 12, in the radial direction of the current collector 13 (direction D in FIG. 10).

For example, in the radial direction of the current collector 13, at least part of the outer peripheral side surface of the main body 131 is flush with the outer peripheral side surface of the end cap 11. For another example, in the radial direction of the current collector 13, at least part of the outer peripheral side surface of the main body 131 is flush with the outer peripheral side surface of the housing 12. For another example, in the radial direction of the current collector 13, at least part of the outer peripheral side surface of the main body 131 protrudes from the outer peripheral side surface of the end cap 11. For another example, in the radial direction of the current collector 13, at least part of the outer peripheral side surface of the main body 131 protrudes from the outer peripheral side surface of the housing 12.

In the embodiments, the main body 131 is flush with or even protrudes from the end cap 11 and/or the housing 12. In other words, the radial dimension of the main body 131 is equal to or greater than the radial dimension of the outer peripheral side of the end cap 11; and/or, the radial dimension of the main body 131 is equal to or greater than the radial dimension of the outer peripheral side of the housing 12. Moreover, in the radial direction of the current collector 13, the welding portion 132 is connected to the outer peripheral side of the main body 131, so the radial dimension of the current collector 13 is greater than both the radial dimension of the outer peripheral side of the end cap 11 and the radial dimension of the outer peripheral side of the housing 12, or the diameter of the current collector 13 is slightly greater than both the diameter of the end cap 11 and the diameter of the housing 12.

Therefore, in the welding process, the end cap 11, the current collector 13, and the housing 12 may be placed horizontally after assembly, and then welding is performed once on a side wall of the energy storage device 1 to achieve shaping. Specifically, before welding the current collector 13, the end cap 11, and the housing 12 together, the current collector 13 may be arranged protruding from the end cap 11 and the housing 12. It may also be understood that, the current collector 13 has a welding convex ring protruding from both an outer side wall of the end cap 11 and an outer side wall of the housing 12, where the welding convex ring is used for welding. In this way, it is conducive to aligning a laser welding head with the welding convex ring to directly heat the welding convex ring, then the housing 12 is uniformly rotated by a full turn to complete welding. In this case, the welding convex ring is firstly heated and melted to achieve "top melting". That is, the welding convex ring melted flows to two sides under the action of gravity to fill the gap between the end cap 11 and the current collector 13 or the gap between the housing 12 and the current collector 13, then the welding convex ring melted is fused together with the end cap 11 and the housing 12 that are melted subsequently, thereby further enhancing the structural strength and airtightness of the welding region. It may be understood that, the welding convex ring may be melted to a solder. In addition, due to the effect of "top melting" of the welding convex ring, requirements for a machining precision of a joint surface of the end cap 11 and a joint surface of the housing 12 are reduced, and thus the manufacturing cost of components of the energy storage device 1 is further reduced.

Optionally, as illustrated in FIG. 13, before welding the current collector 13, the end cap 11, and the housing 12 together, the current collector 13 protrudes from both the end cap 11 and the housing 12 by a width L3, where the width L3 satisfies: 0.25 mm≤L3≤2 mm. It may also be understood that, the welding convex ring protrudes from both the end cap 11 and the housing 12 by the width L3, where the width L3 satisfies: 0.25 mm≤L3≤2 mm. The width L3 refers to a distance from an outer peripheral side wall of the current collector 13 to an outer peripheral side wall of the end cap 11, or a distance from the outer peripheral side wall of the current collector 13 to the outer peripheral side wall of the housing 12. Specifically, the width L3 may be equal to but is not limited to 0.25 mm, 0.3 mm, 0.35 mm, 0.4 mm, 0.45 mm, 0.5 mm, 0.55 mm, 0.6 mm, 0.65 mm, 0.7 mm, 0.75 mm, 0.8 mm, 0.85 mm, 0.9 mm, 0.95 mm, 1 mm, 1.1 mm, 1.2 mm, 1.3 mm, 1.4 mm, 1.5 mm, 1.6 mm, 1.7 mm, 1.8 mm, 1.9 mm, 2 mm, and the like.

In the embodiment, in the case where the width L3 satisfies 0.25 mm≤L3≤2 mm, not only requirements for the machining precision of the joint surface of the end cap 11 and the joint surface of the housing 12 may be reduced and the structural strength and airtightness of the welding region may be enhanced, but also the time for welding may be reduced, the efficiency of welding may be improved, and the manufacturing cost may be reduced. In the case where the width L3 is too small, it is not conducive to aligning the laser welding head with the welding convex ring, and thus requirements for the machining precision of the joint surface of the end cap 11 and the joint surface of the housing 12 may be increased. Further, in this case, it is not conducive to welding the end cap 11 and the housing 12 using the melted welding convex ring, and thus the structural strength and airtightness of the welding region may be reduced. In the case where the width L3 is too large, the time for welding may be increased, thus reducing the welding efficiency and increasing the manufacturing cost.

As illustrated in FIG. 7, in an embodiment, the welding portion 132 protrudes from the end cap 11 by a width L1, and the width L1 satisfies: 0.05 mm≤L1≤1.45 mm; and/or the welding portion 132 protrudes from the housing 12 by a width L2, and the width L2 satisfies: 0.05 mm≤L2≤1.45 mm. The width L1 refers to a distance from an outer peripheral side wall of the welding portion 132 to the outer peripheral side wall of the end cap 11, or refers to a height at which the welding portion 132 protrudes from the outer peripheral side wall of the end cap 11. The width L2 refers to a distance from the outer peripheral side wall of the welding portion 132 to the outer peripheral side wall of the housing 12, or refers to a height at which the welding portion 132 protrudes from the outer peripheral side wall of the housing 12. Specifically, the width L1 and L2 may both be equal to but are not limited to 0.05 mm, 0.10 mm, 0.15 mm, 0.20 mm, 0.25 mm, 0.3 mm, 0.35 mm, 0.4 mm, 0.45 mm, 0.5 mm, 0.55 mm, 0.6 mm, 0.65 mm, 0.7 mm, 0.75 mm, 0.8 mm, 0.85 mm, 0.9 mm, 0.95 mm, 1 mm, 1.05 mm, 1.1 mm, 1.15 mm, 1.2 mm, 1.25 mm, 1.3 mm, 1.35 mm, 1.4 mm, 1.45 mm, and the like.

In the embodiment, the width L1 satisfies 0.05 mm≤L1≤1.45 mm. In the case where the width L1 is greater than or equal to 0.05 mm, the height at which the welding portion 132 protrudes from a side wall surface of the end cap 11 is greater than or equal to 0.05 mm. In this case, during welding, not only it can be ensured that a small gap between the current collector 13 and the end cap 11 can be sufficiently filled with the melted welding portion 132, but also it can be ensured that the melted welding portion 132 has a redundant portion protruding from the side wall surface of the end cap 11, thereby improving the sealing performance and the structural strength of welding. In the case where the width L1 is less than or equal to 1.45 mm, the welding seam formed after welding does not protrude excessively from the side wall surface of the end cap 11, so that in subsequent plastically encapsulation of an insulation film, the insulation film is not prone to wrinkle, and an interference between the energy storage device 1 and an accommodating groove of a module may not easily occur during assembly of the energy storage device 1 and the module, so that the energy storage device 1 may be placed smoothly.

In the embodiment, the width L2 satisfies 0.05 mm≤L2≤1.45 mm. In the case where the width L2 is greater than or equal to 0.05 mm, the height at which the welding portion 132 protrudes from a side wall surface of the housing 12 is greater than or equal to 0.05 mm. In this case, during welding, not only it can be ensured that a small gap between the current collector 13 and the housing 12 can be sufficiently filled with the melted welding portion 132, but also it can be ensured that the melted welding portion 132 has a redundant portion protruding from the side wall surface of the housing 12, thereby improving the sealing performance and the structural strength of welding. In the case where the width L2 is less than or equal to 1.45 mm, the welding seam formed after welding does not protrude excessively from the side wall surface of the housing 12, so that in subsequent plastically encapsulation of an insulation film, the insulation film is not prone to wrinkle, and an interference between the energy storage device 1 and an accommodating groove of a module may not easily occur during assembly of the energy storage device 1 and the module, so that the energy storage device 1 may be placed smoothly.

As illustrated in FIG. 1 to FIG. 13, in an embodiment, the outer peripheral side surface of the end cap 11 is flush with the outer peripheral side surface of the housing 12.

In the embodiment, the outer peripheral side surface of the end cap 11 is flush with the outer peripheral side surface of the housing 12. In other words, the radial dimension of the outer peripheral side wall of the end cap 11 is equal to the radial dimension of the outer peripheral side wall of the housing 12, or say, the outer diameter of the end cap 11 is equal to the outer diameter of the housing 12. In this way, during welding of the current collector 13 to both the end cap 11 and the housing 12, a portion where the current collector 13 is welded to the end cap 132 using the welding portion 132 may be substantially the same as a portion where the current collector 13 is welded to the housing 12 using the welding portion 132 in some aspects, in other words, an area of the welding region between the current collector 13 and the end cap 11 is substantially equal to or equal to an area of the welding region between the current collector 13 and the housing 12.

Therefore, by means of that the radial dimension of the outer side wall of the end cap 11 is equal to the radial dimension of the outer side wall of the housing 12, the difficulty of assembly may be reduced and stability of assembly may be improved, and also the energy density per unit volume of the energy storage device 1 may be increased.

Figure 14:
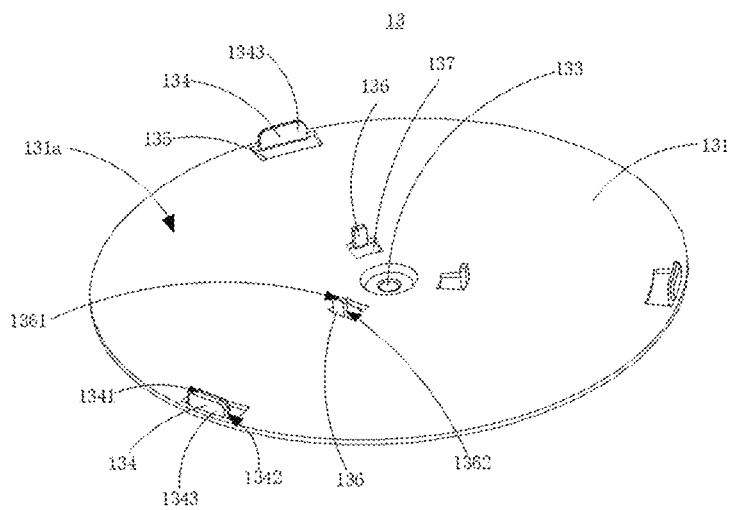
FIG. 14 is a schematic structural view of a current collector provided in an embodiment of the disclosure.
Figure 15:
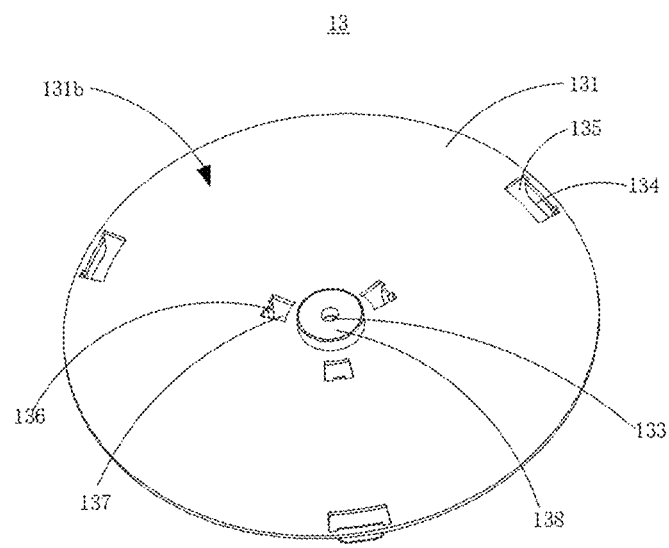
FIG. 15 is a schematic structural view of the current collector in FIG. 14, viewed from another direction.
Figure 16:
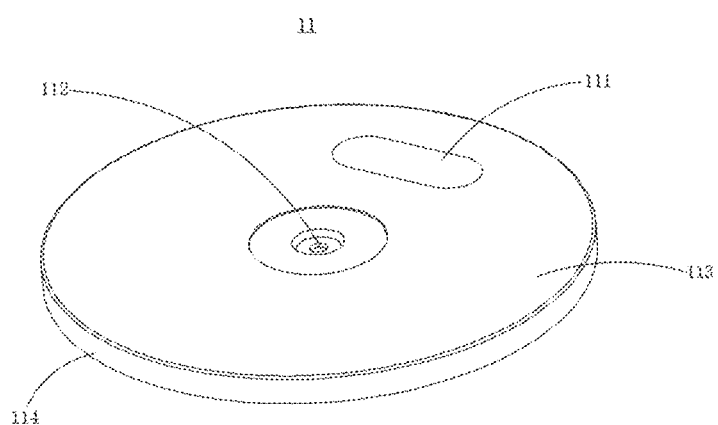
FIG. 16 is a schematic structural view of an end cap provided in an embodiment of the disclosure.
Figure 17:
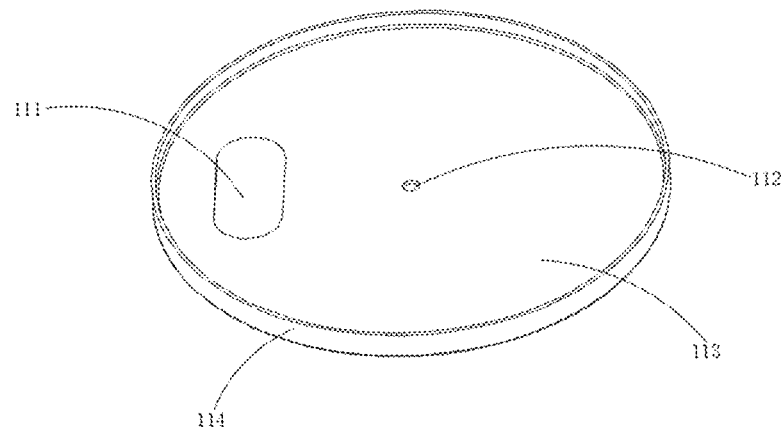
FIG. 17 is a schematic structural view of the end cap in FIG. 16, viewed from another direction.
Figure 18:
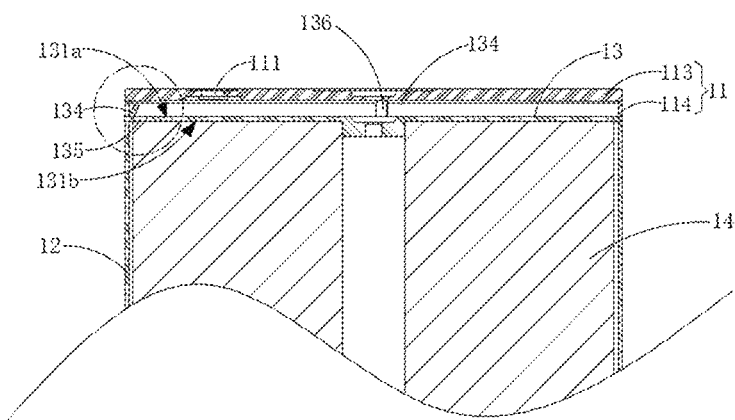
FIG. 18 is cross-sectional view 2 of the embodiment of FIG. 1, taken along line A-A.
Figure 19:
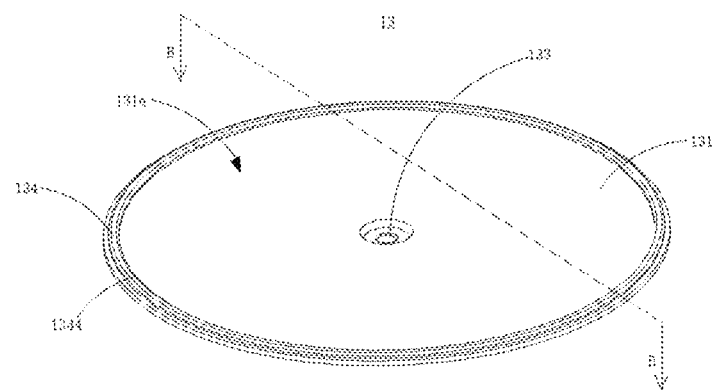
FIG. 19 is a schematic structural view of a current collector in another embodiment of the disclosure.
Figure 20:
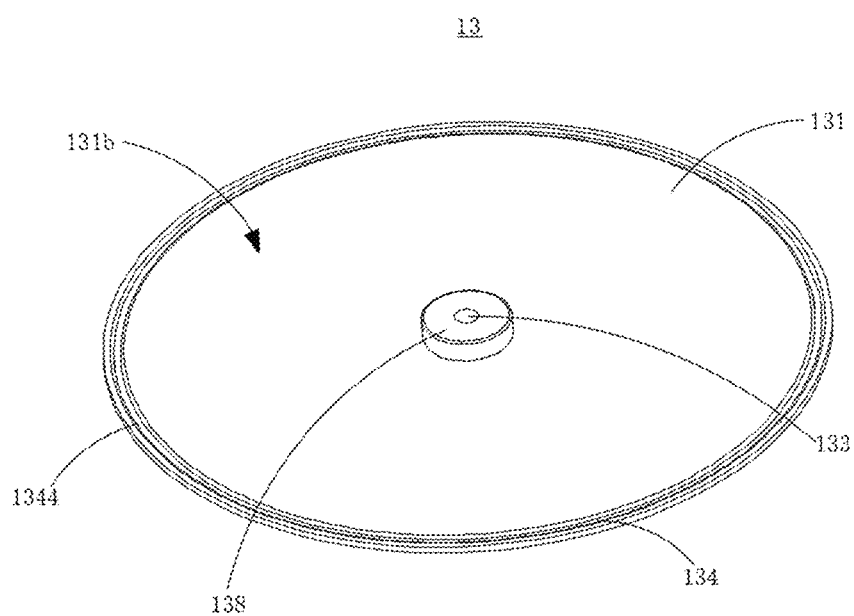
FIG. 20 is a schematic structural view of the current collector in FIG. 19, viewed from another direction.
Figure 21:
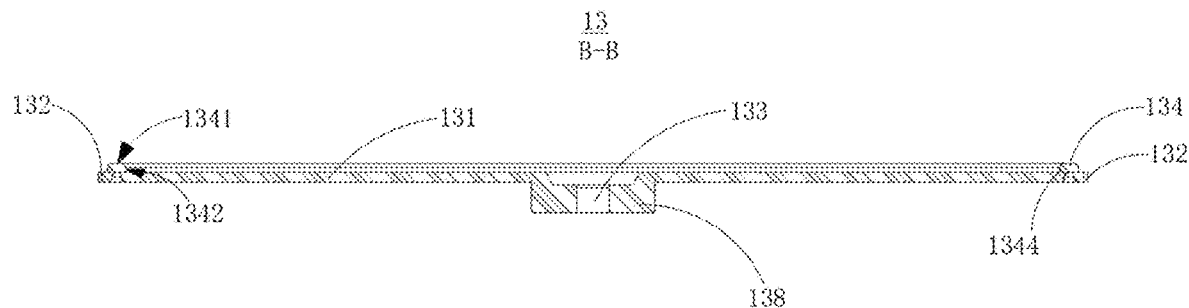
FIG. 21 is a cross-sectional view of the embodiment of FIG. 19, taken along line B-B.

Reference is made to FIG. 14 to FIG. 21. FIG. 14 is a schematic structural view of a current collector provided in an embodiment of the disclosure. FIG. 15 is a schematic structural view of the current collector in FIG. 14, viewed from another direction. FIG. 16 is a schematic structural view of an end cap provided in an embodiment of the disclosure. FIG. 17 is a schematic structural view of the end cap in FIG. 16, viewed from another direction. FIG. 18 is cross-sectional view 2 of the embodiment of FIG. 1, taken along line A-A. FIG. 19 is a schematic structural view of a current collector in another embodiment of the disclosure. FIG. 20 is a schematic structural view of the current collector in FIG. 19, viewed from another direction. FIG. 21 is a cross-sectional view of the embodiment of FIG. 19, taken along line B-B.

In an embodiment, a first positioning portion 134 protrudes from the first surface 131a of the main body 131, and an outer peripheral side surface of the first positioning portion 134 is spaced apart from the outer peripheral side surface of the main body 131. The end cap 11 includes a first portion 113 and a second portion 114, where the second portion 114 is connected to a periphery of the first portion 113 in a bending manner. A surface of the second portion 114 close to the main body 131 is connected to the first surface 131a, and an inner peripheral side surface of the second portion 114 abuts against the outer peripheral side surface of the first positioning portion 134.

The end cap 11 provided in the embodiment includes the first portion 113 and the second portion 114, and the second portion 114 is connected to the first portion 113 in a bending manner. The first portion 113 is farther away from the current collector 13 than the second portion 114. The first portion 113 is angled relative to the second portion 114. A side surface of the second portion 114 away from the first portion 113 is connected to the first surface 131a, and the first surface 131a and a surface of the first portion 113 facing the current collector 13 define a gap therebetween. It may be understood that the end cap 11 is similarly shaped to a bottle cap.

The main body 131 provided in the embodiment includes the first positioning portion 134. The first positioning portion 134 plays a positioning role during assembly of the end cap 11 to the current collector 13. The outer peripheral side surface of the first positioning portion 134 and the outer peripheral side surface of the main body 131 define a gap therebetween, so that it is conducive to connecting the second portion 114 of the end cap 11 to the first surface 131a. The inner peripheral side surface of the second portion 114 abuts against the outer peripheral side surface of the first positioning portion 134. For example, part of the inner peripheral side surface of the second portion 114 abuts against the outer peripheral side surface of the first positioning portion 134. For another example, part of the inner peripheral side surface of the second portion 114 abuts against part of the outer peripheral side surface of the first positioning portion 134. It may also be understood that, the end cap 11 includes the second portion 114 that extends from the first portion 113 in a direction towards the current collector 13, and the second portion 114 covers the first positioning portion 134. Optionally, a surface of the first positioning portion 134 facing away from the main body 131 is spaced apart from a surface of the first portion 113 facing the main body 131. Alternatively, the surface of the first positioning portion 134 facing away from the main body 131 abuts against the surface of the first portion 113 facing the main body 131. Optionally, the first positioning portion 134 is obtained by stamping the main body 131. The first positioning portion 134 can be formed on the first surface 131a by stamping the second surface 131b of the main body 131 in a direction from the second surface 131b to the first surface 131a.

In the embodiment, the first positioning portion 134 is arranged on the first surface 131a of the main body 131, and the outer peripheral side surface of the first positioning portion 134 abuts against an outer peripheral side surface of the second portion 114 of the end cap 11, to facilitate positioning during assembly of the end cap 11 to the current collector 13, so that not only the difficulty of assembly is reduced and a precision of assembly of the end cap 11 and the current collector 13 is improved, but also tooling requirements for performing welding once are reduced. In addition, an outer side wall of the first positioning portion 134 abuts against an inner side wall of the second portion 114 of the end cap 11, so that an area of a current-flow through region between the end cap 11 and the current collector 13 may be increased, thereby further enhancing the current-flow through capability between the end cap 11 and the current collector 13.

Optionally, the first portion 113 of the end cap 11 defines the second liquid-injection hole 112, where the second liquid-injection hole 112 is defined on the center of the first portion 113. The main body 131 of the current collector 13 defines the first liquid-injection hole 133, where the first liquid-injection hole 133 is defined on the center of the main body 131. In the embodiment, the first positioning portion 134 is arranged on the first surface 131a of the main body 131 to play a positioning role, so that during assembly of the end cap 11 to the current collector 13, the center of the first portion 113 of the end cap 11 may be arranged corresponding to the center of the main body 131 of the current collector 13, in other words, the central axis of the end cap 11 coincides with the central axis of the current collector 13, or say, the circle center of the end cap 11 coincides with the circle center of the current collector 13. In this case, the first liquid-injection hole 133 is arranged corresponding to the second liquid-injection hole 112, so that efficiency of injection of liquid may be improved, the difficulty of assembly may be reduced, and the precision of assembly of the end cap 11 to the current collector 13 may be improved.

Optionally, the explosion-proof valve 111 is arranged on the first portion 113 of the end cap 11, and the explosion-proof valve 111 is used to exhaust gas generated inside the energy storage device 1. The first positioning portion 134 and the first portion 113 cooperatively define a gas accumulating space, where the gas accumulating space is used to accommodate the gas generated inside the energy storage device 1. In the embodiment, the first positioning portion 134 is arranged on the first surface 131a of the main body 131 to define the gas accumulating space beneath the explosion-proof valve 111 on the end cap 11. In this way, it is conducive for accumulation of the gas generated inside the energy storage device 1 in the gas accumulating space, and the gas can be discharged from the explosion-proof valve 111 when an air pressure in the gas accumulating space reaches a preset value, thereby preventing explosion and accordingly further improving the safety of the energy storage device 1. In addition, in the case where the end cap 11 is impacted by gas or a strike, the first positioning portion 134 can abut against the end cap 11, for example, the outer side wall of the first positioning portion 134 abuts against the inner side wall of the second portion 114, and a top surface of the first positioning portion 134 facing away from the main body 131 abuts against the surface of the first portion 113 facing the current collector 13, thereby reducing the degree of deformation and improving the structural strength of the energy storage device 1.

Figure 22:
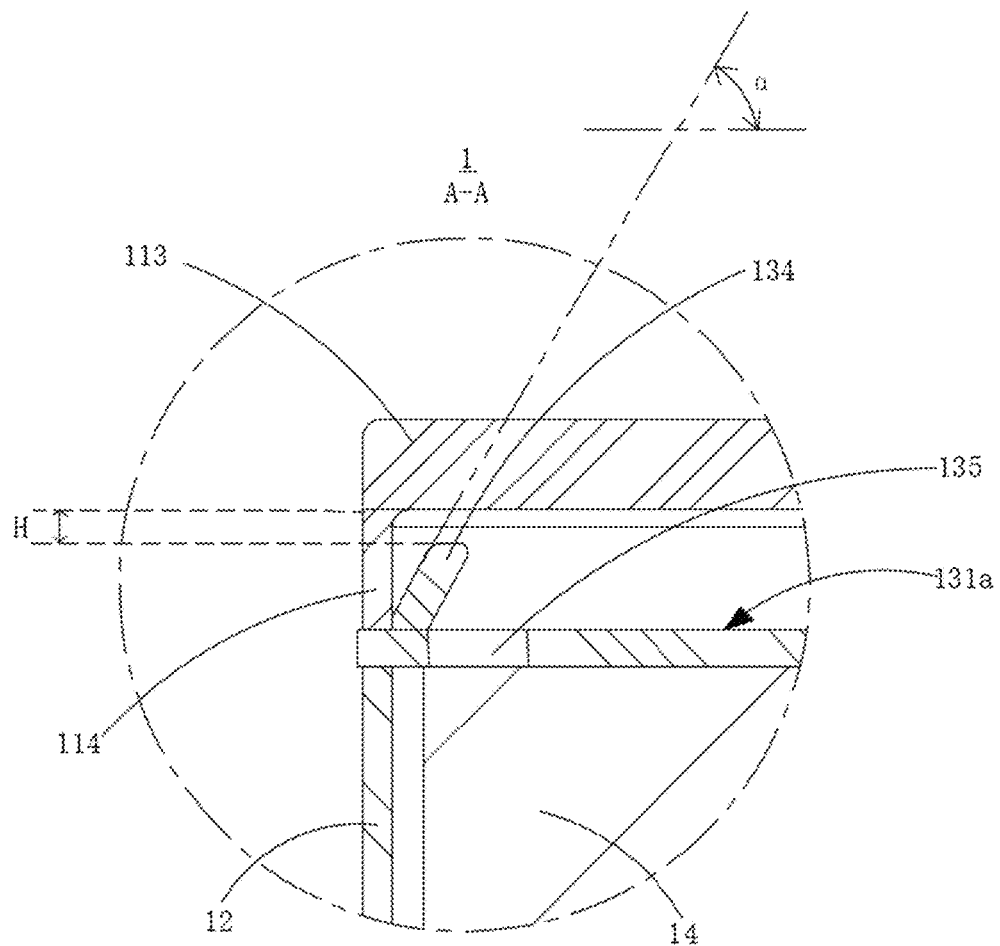
FIG. 22 is a partially enlarged view of FIG. 18.

FIG. 22 is a partially enlarged view of FIG. 18. As illustrated in FIG. 18 to FIG. 22, in an embodiment, an end of the first positioning portion 134 facing away from the main body 131 is spaced apart from the surface of the first portion 113 facing the main body 131.

In the embodiment, the end of the first positioning portion 134 facing away from the main body 131 and the surface of the first portion 113 facing the main body 131 defines a gap therebetween. In other words, the first positioning portion 134 is spaced apart from the first portion 113. In the embodiment, the first positioning portion 134 is spaced apart from the first portion 113, so that the first positioning portion 134 may not directly abut against the first portion 113 of the end cap 11 during assembly of the end cap 11 and the current collector 13. In this way, the possibility of damaging the end cap 11 by the first positioning portion 134 may be reduced. Moreover, in the case where the end cap 11 is impacted by gas or a strike, the first portion 113 of the deformed end cap 11 may abut against the surface of the first positioning portion 134 facing away from the main body 131, thereby reducing the degree of deformation and improving the structural strength of the energy storage device 1.

Optionally, a distance H between the surface of the first positioning portion 134 facing away from the main body 131 and the surface of the first portion 113 facing the main body 131 (as illustrated in FIG. 22) satisfies: $0<H\leq 0.5$ mm. Specifically, the distance H may be equal to but is not limited to 0.05 mm, 0.1 mm, 0.15 mm, 0.2 mm, 0.25 mm, 0.3 mm, 0.35 mm, 0.4 mm, 0.45 mm, 0.5 mm, etc.

In the embodiment, in the case where the distance H satisfies $0<H\leq 0.5$ mm, not only the possibility of damaging the end cap 11 by the first positioning portion 134 may be reduced, but also the first positioning portion 134 may support the end cap 11 in the case where the end cap 11 is impacted, so as to reduce the degree of deformation of the end cap 11. In the case where the distance H is too small, it may be easy for the first positioning portion 134 to directly abut against the end cap 11, resulting in that the end cap 11 may be easily damaged by the first positioning portion 134. In the case where the distance H is too large, the first positioning portion 134 may not be able to support the end cap 11 in the case where the end cap 11 is impacted, resulting in a relatively high degree of deformation of the end cap 11, thereby reducing the structural strength of the energy storage device 1.

As illustrated in FIG. 14 and FIG. 21, in an embodiment, the first positioning portion 134 has a first top surface 1341 and a first side surface 1342, where the first top surface 1341 faces away from the first surface 131a, and the first side surface 1342 is connected to the first top surface 1341 in a bending manner. The first side surface 1342 is further connected to the first surface 131a, and a connection between the first top surface 1341 and the first side surface 1342 has an arc chamfer.

In the embodiment, the connection between the first top surface 1341 and the first side surface 1342 has an arc chamfer, which may be understood as that the connection between the first top surface 1341 and the first side surface 1342 is a curved surface and the curved surface protrudes in a direction away from the first surface 131a, in other words, the curved surface protrudes in a direction towards the first portion 113 of the end cap 11.

Optionally, in the case where the first positioning portion 134 includes multiple positioning protrusions 1343 spaced apart from each other, a connection between the first top surface 1341 and the first side surface 1342 of each of the multiple positioning protrusions 1343 has an arc chamfer. Alternatively, a connection between the first top surface 1341 and the first side surface 1342 of each of some of the multiple positioning protrusions 1343 has an arc chamfer. In the case where the first positioning portion 134 includes a positioning convex ring 1344 arranged in a circumferential direction of the second portion 114, a connection between the first top surface 1341 and the first side surface 1342 of the positioning convex ring 1344 has an arc chamfer. It may also be understood that, the positioning convex ring 1344 protrudes in a direction towards the first portion 113, in other words, a top of the positioning convex ring 1344 is an arc-shaped curved edge.

In the embodiment, the connection between the first top surface 1341 and the first side surface 1342 has an arc chamfer, so that during assembly of the end cap 11 and the current collector 13, the possibility that the first positioning portion 134 scratches the end cap 11 may be reduced, or even the first positioning portion 134 is prevented from scratching the end cap 11, and thus the end cap 11 may be prevented from being scratched and accordingly metal debris may be avoided. Therefore, a short circuit inside the energy storage device 1 may be avoided, thereby improving the safety of the energy storage device 1. In addition, the connection between the first top surface 1341 and the first side surface 1342 has an arc chamfer, so that it is conducive for assembly positioning during assembly of the end cap 11 to the current collector 13, thereby reducing the difficulty of assembly and reducing tooling requirements for performing welding once.

The first positioning portion 134 has two structural forms. As illustrated in FIG. 19 to FIG. 20, in an embodiment, the first positioning portion 134 includes the positioning convex ring 1344 arranged in the circumferential direction of the second portion 114.

The first positioning portion 134 includes the positioning convex ring 1344 arranged in the circumferential direction of the second portion 114, which may be understood as that the positioning convex ring 1344 has a circular structure. Optionally, the positioning convex ring 1344 is obtained by stamping the main body 131. By stamping the second surface 131b of the main body 131 in the direction from the second surface 131b to the first surface 131a, the positioning convex ring 1344 can be formed on the first surface 131a. The positioning convex ring 1344 may also be understood as a convex ring formed by folding.

First, by means of the positioning convex ring 1344, the structural strength of the current collector 13 may be increased, and thus the possibility of distortion and deformation of the current collector 13 may be reduced. Second, an outer side wall of the positioning convex ring 1344 can abut against a relatively large portion of the inner side wall of the second portion 114 of the end cap 11, which may further increase the area of the current-flow through region between the end cap 11 and the current collector 13, thereby further enhancing the current-flow through capability between the end cap 11 and the current collector 13. Third, by means of the positioning convex ring 1344, during welding, the possibility that a soldering fluid flows to the gap between the end cap 11 and the current collector 13 may be reduced, or the case that the soldering fluid flows to the gap between the end cap 11 and the current collector 13 may even be avoided, thereby reducing the possibility of short circuit inside the energy storage device 1.

As illustrated in FIG. 14, FIG. 15, and FIG. 18, in an embodiment, the first positioning portion 134 includes multiple positioning protrusions 1343 spaced apart from each other.

The first positioning portion 134 includes multiple positioning protrusions 1343 spaced apart from each other. Optionally, there are at least three positioning protrusions 1343. Optionally, a distance between any two adjacent positioning protrusions 1343 is equal. Optionally, the multiple positioning protrusions 1343 are arranged on the first surface 131a at equal intervals in a circumferential direction of the second portion 114. Optionally, each positioning protrusion 1343 is obtained by stamping the main body 131. By stamping the second surface 131b of the main body 131 in the direction from the second surface 131b to the first surface 131a, the positioning protrusion 1343 can be formed on the first surface 131a. The positioning protrusion 1343 may be arranged at a position according to the requirements for a product, so that for assembly of the current collector 13 and the end cap 11, the range of application of the current collector 13 may be improved.

As illustrated in FIG. 22, in an embodiment, the positioning protrusion 1343 is inclined towards a central axis of the main body 131, and an included angle $\alpha$ between the first surface 131a and an outer peripheral side surface of the positioning protrusion 1343 facing away from the central axis of the main body 131 satisfies: $80° \leq \alpha \leq 85°$.

In the embodiment, the positioning protrusion 1343 is inclined towards a central axis of the main body 131, so that part of the outer peripheral side surface of the first positioning portion 134 abuts against part of the outer peripheral side surface of the second portion 114. Therefore, it is conducive for positioning during assembly of the end cap 11 to the current collector 13, and thus not only the difficulty of assembly may be reduced and the precision of assembly of the end cap 11 to the current collector 13 may be increased, but also tooling requirements for performing welding once may be reduced.

Optionally, the positioning protrusion 1343 is obtained by stamping the main body 131. By stamping the second surface 131b of the main body 131 in the direction from the second surface 131b to the first surface 131a, the inclined positioning protrusion 1343 can be formed. It may be understood that the positioning protrusion 1343 provided in the embodiment is a folding protrusion that is folded about 90 degrees relative to a direction towards the first portion 113, and the folding protrusion at an outer side of the first surface 131a (i.e., at a position of the first surface 131a away from the center of the first surface 131a) may be inclined at an angle of 5 to 10 degrees relative to the center of the first surface 131a.

Optionally, the included angle $\alpha$ between the first surface 131a and an outer peripheral side surface of the positioning protrusion 1343 facing away from the central axis of the main body 131 satisfies: $80° \leq \alpha \leq 85°$. Specifically, the included angle $\alpha$ may be equal to but is not limited to 80°, 81°, 82°, 83°, 84°, 85°, and the like.

In the embodiment, in the case where the included angle $\alpha$ satisfies $80° \leq \alpha \leq 85°$, not only it is conducive for positioning during assembly of the end cap 11 to the current collector 13, but also the possibility of scratching the end cap 11 by the first positioning portion 134 may be reduced. In the case where the included angle $\alpha$ is relatively small, it is not conducive for positioning during assembly of the end cap 11 to the current collector 13. In the case where the included angle $\alpha$ is too large, it may be easy for the first positioning portion 134 to directly abut against the end cap 11, and thus the end cap 11 may be damaged by the first positioning portion 134 easily.

As illustrated in FIG. 14, FIG. 15, FIG. 18, and FIG. 22, in an embodiment, the main body 131 defines multiple first through holes 135 penetrating through both the first surface 131a and the second surface 131b.

In the embodiment, the main body 131 defines multiple first through holes 135 penetrating through both the first surface 131a and the second surface 131b. Optionally, there are 2-6 first through holes 135. Further, optionally, there are three first through holes 135. Optionally, a distance between any two adjacent first through holes 135 is equal. In other words, the multiple first through holes 135 are arranged on the main body 131 at equal intervals. By means of the multiple first through holes 135 on the main body 131, it is conducive for the electrolyte to flow through the first through hole 135 to the electrode assembly 14 to quickly immerse the electrode assembly 14, thereby improving the efficiency of immersing of the electrolyte.

As illustrated in FIG. 14, FIG. 15, FIG. 18, and FIG. 22, in an embodiment, at least one first through hole 135 and at least one positioning protrusion 1343 that is connected to an inner side wall of the first through hole 135 cooperatively form a first folding group, and the first folding group and the main body 131 are integrally formed by a stamping process.

In the embodiment, the positioning protrusion 1343 and the first through hole 135 can both be formed on the main body 131 by stamping the second surface 131b of the main body 131 in the direction from the second surface 131b to the first surface 131a. In other words, two structures, i.e., one first through hole 135 and one positioning protrusion 1343, may be obtained by performing stamping once. In this way, the process of manufacturing the energy storage device 1 may be simplified, and the efficiency of manufacturing the energy storage device 1 may be improved.

As illustrated in FIG. 14, FIG. 15, and FIG. 18, in an embodiment, multiple limiting protrusions 136 are arranged spaced apart from each other on the first surface 131a of the main body 131. An outer peripheral side surface of the limiting protrusion 136 is spaced apart from the outer peripheral side surface of the main body 131. The end cap 11 includes the first portion 113 and the second portion 114, where the second portion 114 is connected to the periphery of the first portion 113 in a bending manner. A surface of the second portion 114 close to the main body 131 is connected to the first surface 131a, and a surface of the limiting protrusion 136 facing away from the main body 131 abuts against the surface of the first portion 113 facing the main body 131.

The end cap 11 provided in the embodiment includes the first portion 113 and the second portion 114, and the second portion 114 is connected to the first portion 113 in a bending manner. The first portion 113 is farther away from the current collector 13 than the second portion 114. The first portion 113 is angled relative to the second portion 114. A side surface of the second portion 114 away from the first portion 113 is connected to the first surface 131a. The first surface 131a and the surface of the first portion 113 facing the current collector 13 define a gap therebetween. It may be understood that, the end cap 11 is similarly shaped to a bottle cap.

The main body 131 provided in the embodiment includes the limiting protrusion 136. The limiting protrusion 136 is used to limit and support the end cap 11, to play a limiting and supporting role. The surface of the limiting protrusion 136 facing away from the main body 131 abuts against the surface of the first portion 113 facing the main body 131. In other words, the limiting protrusion 136 abuts against the first portion 113 to support the end cap 11. It may also be understood that, the end cap 11 includes the second portion 114 that extends from the first portion 113 in a direction towards the current collector 13, and the second portion 114 covers the first positioning portion 134. An end of the limiting protrusion 136 abuts against the first portion 113, and the other end of the limiting protrusion 136 abuts against the first surface 131a. A distance from a surface of the limiting protrusion 136 facing the main body 131 to the surface of the limiting protrusion 136 facing away from the main body 131 is equal to a distance from the first surface 131a of the main body 131 to the surface of the first portion 113 facing the main body 131. In other words, the height of the limiting protrusion 136 is equal to the distance from the first surface 131a of the main body 131 to the surface of the first portion 113 facing the main body 131.

Optionally, there are 2-6 limiting protrusions 136. Optionally, there are 3 limiting protrusions 136. Optionally, a distance between any two adjacent limiting protrusions 136 is equal. In other words, the multiple limiting protrusions 136 are arranged on the first surface 131a at equal intervals. Optionally, the limiting protrusion 136 is obtained by stamping the main body 131. By stamping the second surface 131b of the main body 131 in the direction from the second surface 131b to the first surface 131a, the limiting protrusion 136 can be formed on the first surface 131a. Optionally, the multiple limiting protrusions 136 are arranged close to the central axis of the current collector 13. The multiple limiting protrusions 136 are able to support a central portion of the current collector 13, thereby preventing the current collector 13 and the end cap 11 from deformation, and thus improving the structural strength of the energy storage device 1.

Optionally, in the case where the multiple limiting protrusions 136 and the multiple first positioning portions 134 are spaced apart on the first surface 131a of the main body 131, the multiple limiting protrusions 136 are closer to the central axis of the main body 131 than the multiple first positioning portions 134. It may be understood that each limiting protrusion 136 is a protrusion arranged on the inner side of the first surface 131a, i.e., each limiting protrusion 136 is arranged adjacent to the center of the first surface 131a, and each first positioning portion 134 is a structural member arranged on the outer side of the first surface 131a, i.e., each first positioning portion 134 is arranged at a position of the first surface 131a away from the center of the first surface 131a.

In the embodiment, the limiting protrusion 136 is arranged on the first surface 131a of the main body 131, and the limiting protrusion 136 abuts against the first portion 113 of the end cap 11 to support the end cap 11, and thus the structural strength of the end cap 11 and the current collector 13 may be improved. In the case where the energy storage device 1 is impacted, the limiting protrusion 136 is able to abut against the end cap 11 to prevent the current collector 13 and the end cap 11 from bulging upwards or denting downwards for example, thereby reducing the degree of deformation and further improving the structural strength of the energy storage device 1.

Optionally, the explosion-proof valve 111 is arranged on the first portion 113 of the end cap 11, and the explosion-proof valve 111 is used to exhaust gas generated inside the energy storage device 1. The limiting protrusion 136 and the first portion 113 cooperatively define a gas accumulating space, where the gas accumulating space is used to accommodate the gas generated inside the energy storage device 1. In the embodiment, the limiting protrusion 136 is arranged on the first surface 131a of the main body 131 to define the gas accumulating space beneath the explosion-proof valve 111 on the end cap 11. In this way, it is conducive for accumulation of the gas generated inside the energy storage device 1 in the gas accumulating space, and the gas can be discharged from the explosion-proof valve 111 when an air pressure in the gas accumulating space reaches a preset value, thereby preventing explosion and accordingly further improving the safety of the energy storage device 1.

As illustrated in FIG. 14, in an embodiment, the limiting protrusion 136 has a second top surface 1361 and a second side surface 1362. The second top surface 1361 faces away from the first surface 131a, and the second side surface 1362 is connected to the second top surface 1361 in a bending manner. The second side surface 1362 is further connected to the first surface 131a, and a connection between the second top surface 1361 and the second side surface 1362 has an arc chamfer.

In the embodiment, the connection between the second top surface 1361 and the second side surface 1362 has an arc chamfer, which may be understood as that the connection between the second top surface 1361 and the second side surface 1362 is a curved surface and the curved surface protrudes in a direction away from the first surface 131a, in other words, the curved surface protrudes in a direction towards the first portion 113 of the end cap 11. Optionally, the connection between the second top surface 1361 and the second side surface 1362 of each limiting protrusion 136 has an arc chamfer, or the connection between the second top surface 1361 and the second side surface 1362 of some of the limiting protrusions 136 has an arc chamfer.

In the embodiment, the connection between the second top surface 1361 and the second side surface 1362 has an arc chamfer, so that during assembly of the end cap 11 and the current collector 13, the possibility that the limiting protrusion 136 scratches the end cap 11 may be reduced, or even the limiting protrusion 136 is prevented from scratching the end cap 11, and thus the end cap 11 may be prevented from being scratched and accordingly metal debris may be avoided. Therefore, the performance of the energy storage device 1 may not be affected, thereby improving the safety of the energy storage device 1.

As illustrated in FIG. 14, in an embodiment, a peripheral side surface of the limiting protrusion 136 is perpendicular to the first surface 131a.

In the embodiment, the peripheral side surface of the limiting protrusion 136 is perpendicular to the first surface 131a, in other words, the limiting protrusion 136 is perpendicular to the main body 131, so that it is conducive for the limiting protrusion 136 to abut against the first portion 113 of the end cap 11 to support the end cap 11, thereby improving the structural strength of the end cap 11 and the current collector 13.

Optionally, the limiting protrusion 136 is obtained by stamping the main body 131. By stamping the second surface 131b of the main body 131 in the direction from the second surface 131b to the first surface 131a, the limiting protrusion 136 that is perpendicular to the first surface 131a can be formed. It may be understood that the limiting protrusion 136 provided in the embodiment is a folding protrusion that is folded about 90 degrees relative to a direction towards the first portion 113.

As illustrated in FIG. 14 and FIG. 15, in an embodiment, the main body 131 defines multiple second through holes 137 penetrating through both the first surface 131a and the second surface 131b. The second through hole 137 is configured to allow the electrolyte to flow to the housing 12.

In the embodiment, the main body 131 defines multiple second through holes 137 penetrating through both the first surface 131a and the second surface 131b. Optionally, there are 2-6 second through holes 137. Further, optionally, there are 3 second through holes 137. Optionally, a distance between any two adjacent second through holes 137 is equal. In other words, the multiple second through holes 137 are arranged on the main body 131 at equal intervals. By means of the multiple second through holes 137 on the main body 131, it is conducive for the electrolyte to flow through the second through hole 137 to the electrode assembly 14 to quickly immerse the electrode assembly 14, thereby improving the efficiency of immersing of the electrolyte.

As illustrated in FIG. 14 and FIG. 15, in an embodiment, at least one second through hole 137 and at least one limiting protrusion 136 that is connected with an inner side wall of the second through hole 137 cooperatively form a second folding group, and the second folding group and the main body 131 are integrally formed by a stamping process.

In the embodiment, the limiting protrusion 136 and the second through hole 137 can both be formed on the main body 131 by stamping the second surface 131b of the main body 131 in the direction from the second surface 131b to the first surface 131a. In other words, two structures, i.e., one second through hole 137 and one limiting protrusion 136, may be obtained by performing stamping once. In this way, the process of manufacturing the energy storage device 1 may be simplified, and the efficiency of manufacturing the energy storage device 1 may be improved.

As illustrated in FIG. 1 to FIG. 3, FIG. 15, FIG. 20, and FIG. 21, in an embodiment, the energy storage device 1 further includes the electrode assembly 14. The housing 12 defines the accommodating cavity 121. The electrode assembly 14 is arranged in the accommodating cavity 121. The electrode assembly 14 has a winding shape and has a hollow structure 141, a second positioning portion 138 is arranged on the second surface 131b of the main body 131, and at least part of the second positioning portion 138 is inserted into the hollow structure 141.

The energy storage device 1 provided in the embodiment further includes the electrode assembly 14, and the electrode assembly 14 is arranged in the accommodating cavity 121. The energy storage device 1 further includes an electrolyte (not illustrated) in the accommodating cavity 121, and at least part of the electrode assembly 14 is immersed by the electrolyte. The electrode assembly 14 is connected to the second surface 131b of the current collector 13. For example, the electrode assembly 14 is welded to the current collector 13. The electrode assembly 14 has a winding shape and has the hollow structure 141. The hollow structure 141 is an electrically insulated structural pipe formed by winding of plural layers of separators. Optionally, the hollow structure 141 is positioned at the center of the electrode assembly 14.

The main body 131 provided in the embodiment includes the second positioning portion 138, where during assembly of the current collector 13 to the electrode assembly 14, the second positioning portion 138 plays a positioning role. At least part of the second positioning portion 138 is inserted into the hollow structure 141. For example, part of the second positioning portion 138 is inserted into the hollow structure 141. For example, the second positioning portion 138 is completely inserted into the hollow structure 141. For example, the second positioning portion 138 abuts against part of an inner side wall of the hollow structure 141. For example, the second positioning portion 138 is spaced apart from the hollow structure 141. Optionally, the second positioning portion 138 is a protrusion, and at least part of the protrusion is inserted into the hollow structure 141.

In the embodiment, the second positioning portion 138 is arranged on the second surface 131b of the main body 131, and at least part of the second positioning portion 138 is inserted into the hollow structure 141, to facilitate positioning during assembly of the electrode assembly 14 and the current collector 13, so that not only the difficulty of assembly is reduced and the precision of assembly of the electrode assembly 14 and the current collector 13 is improved, but also tooling requirements for performing welding once are reduced.

Optionally, the second positioning portion 138 is positioned on the center of the current collector 13, and the hollow structure 141 is positioned on the center of the electrode assembly 14. In the embodiment, the second positioning portion 138 is arranged on the second surface 131b of the main body 131 to play a positioning role, so that during assembly of the current collector 13 and the electrode assembly 14, the center of the current collector 13 may be arranged corresponding to the center of the electrode assembly 14, in other words, the central axis of the current collector 13 coincides with the central axis of the electrode assembly 14, or say, the circle center of the current collector 13 coincides with the circle center of the electrode assembly 14, thereby improving assembly stability of the energy storage device 1.

As illustrated in FIG. 1 to FIG. 3, FIG. 15, FIG. 20, and FIG. 21, in an embodiment, the main body 131 defines the first liquid-injection hole 133 penetrating through both the first surface 131a and a surface of the second positioning portion 138 facing the electrode assembly 14. An orthographic projection of the first liquid-injection hole 133 on a surface of the electrode assembly 14 facing the current collector 13 falls within the hollow structure 141. The end cap 11 defines the second liquid-injection hole 112. The end cap 11 and the current collector 13 cooperatively define a cavity 115, and the first liquid-injection hole 133 and the second liquid-injection hole 112 are both in communication with the cavity 115.

In the embodiment, the main body 131 defines the first liquid-injection hole 133 penetrating through both the first surface 131a and the surface of the second positioning portion 138 facing the electrode assembly 14. In other words, the first liquid-injection hole 133 penetrates through both the first surface 131a and the surface of the second positioning portion 138 facing away from the end cap 11. Further, the orthographic projection of the first liquid-injection hole 133 on the surface of the electrode assembly 14 facing the current collector 13 falls within the hollow structure 141. In other words, the first liquid-injection hole 133 is arranged corresponding to the hollow structure 141. Optionally, the first liquid-injection hole 133 is arranged close to or directly aligned with the center of the electrode assembly 14. Optionally, the second positioning portion 138 is a convex ring, and at least part of the convex ring is inserted into the hollow structure 141.

In the embodiment, the end cap 11 defines the second liquid-injection hole 112. The end cap 11 and the current collector 13 cooperatively define the cavity 115, and the first liquid-injection hole 133 and the second liquid-injection hole 112 both communicate with the cavity 115. The electrolyte may flow to the cavity 115 through the second liquid-injection hole 112, and then flow to the second liquid-injection hole 112 from the cavity 115. Optionally, the first liquid-injection hole 133 and the second liquid-injection hole 112 are arranged correspondingly.

In the case where the energy storage device 1 has been used for a long period of time, the temperature of the hollow structure 141 of the electrode assembly 14 is relatively high, so that the migration speed of active ions in the electrolyte in the hollow structure 141 of the electrode assembly 14 may be increased, and side reactions may be increased, resulting in quick consumption of the electrolyte in the hollow structure 141 of the electrode assembly 14. Therefore, by means of the first liquid-injection hole 133 penetrating through the surface of the second positioning portion 138 facing the electrode assembly 14, and by means of that the orthographic projection of the first liquid-injection hole 133 on the surface of the electrode assembly 14 facing the current collector 13 falls within the hollow structure 141, the electrolyte can flow through the first liquid-injection hole 133 to the electrode assembly 14 to immerse the electrode assembly 14, in other words, the electrolyte may directly immerse the hollow structure 141 of the electrode assembly 14, so that it can be ensured that there may be sufficient electrolyte in the hollow structure 141 of the electrode assembly 14, thereby prolonging the cycle life of the cell. Moreover, in the case where the electrolyte directly immerses the hollow structure 141 of the electrode assembly 14, the electrolyte may diffuse outward from the hollow structure 141 of the electrode assembly 14, so that the electrolyte is evenly injected in various directions of the electrode assembly 14, and thus the uniformity of the electrolyte inside the electrode assembly 14 may be enhanced, and it is conducive to improving the performance of the energy storage device 1.

Figure 23:
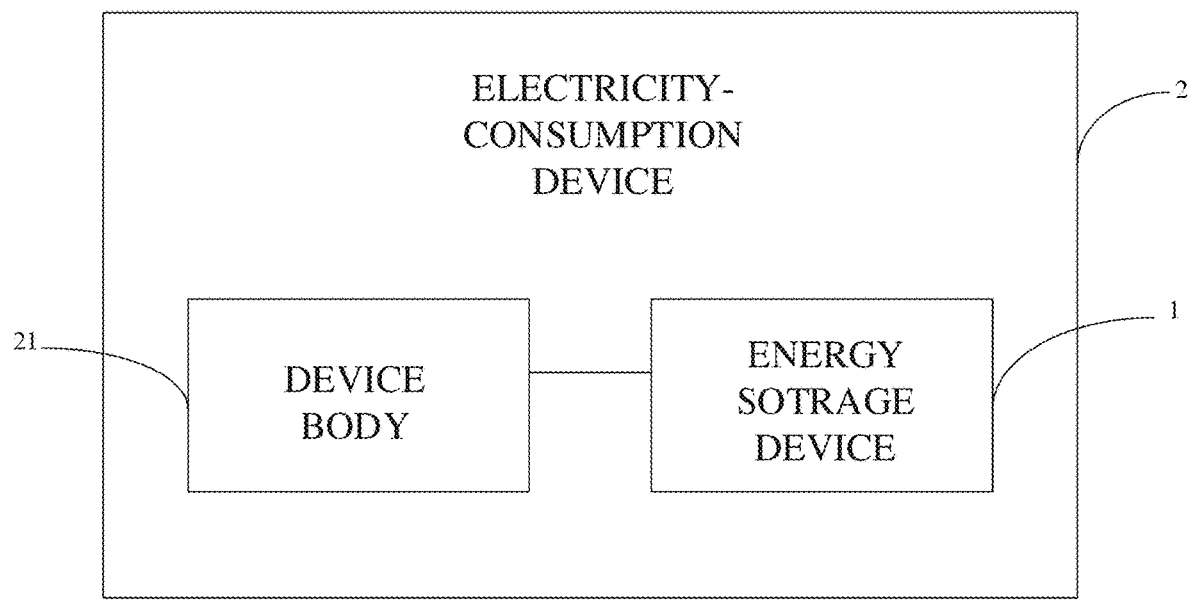
FIG. 23 is a schematic structural view of an electricity-consumption device provided in an embodiment of the disclosure.

FIG. 23 is a schematic structural view of an electricity-consumption device provided in an embodiment of the disclosure. As illustrated in FIG. 23, an electricity-consumption device 2 is further provided in the disclosure. The electricity-consumption device 2 includes a device body 21 and the energy storage device 1 mentioned above, and the energy storage device 1 is configured to power the device body 21.

Optionally, the electricity-consumption device 2 provided in the embodiment of the disclosure may be but is not limited to a portable electrical device such as a cellphone, a tablet computer, a laptop computer, a desktop computer, a smart toy, a smart bracelet, a smart watch, an electronic reader, a game console, a toy, etc. Alternatively, the electricity-consumption device 2 provided in the embodiment of the disclosure may be large equipment such as an e-bike, an electric vehicle, a ship, a spacecraft, etc. It may be understood that, the electricity-consumption device 2 in this embodiment is only a form of the electricity-consumption device 2 to which the cell is applied, and should not be understood as a limitation to the electricity-consumption device 2 provided in the disclosure, nor should it be understood as a limitation to the cell provided in each of the embodiments of the disclosure.

In the electricity-consumption device 2 provided in the embodiment, the energy storage device 1 provided in the disclosure is used. The current collector 13 is arranged between the end cap 11 and the housing 12 and is welded to both the peripheral side surface of the end cap 11 and the peripheral side surface of the housing 12, and thus the welding region between the end cap 11 and the current collector 13 may be enlarged, thereby improving the current-flow through capability between the end cap 11 and the current collector 13, and accordingly improving the strength of connection among the end cap 11, the current collector 13, and the housing 12. Therefore, the energy storage device 1 may provide stable electricity for the device body 21 when powering the device body 21.

Figure 24:
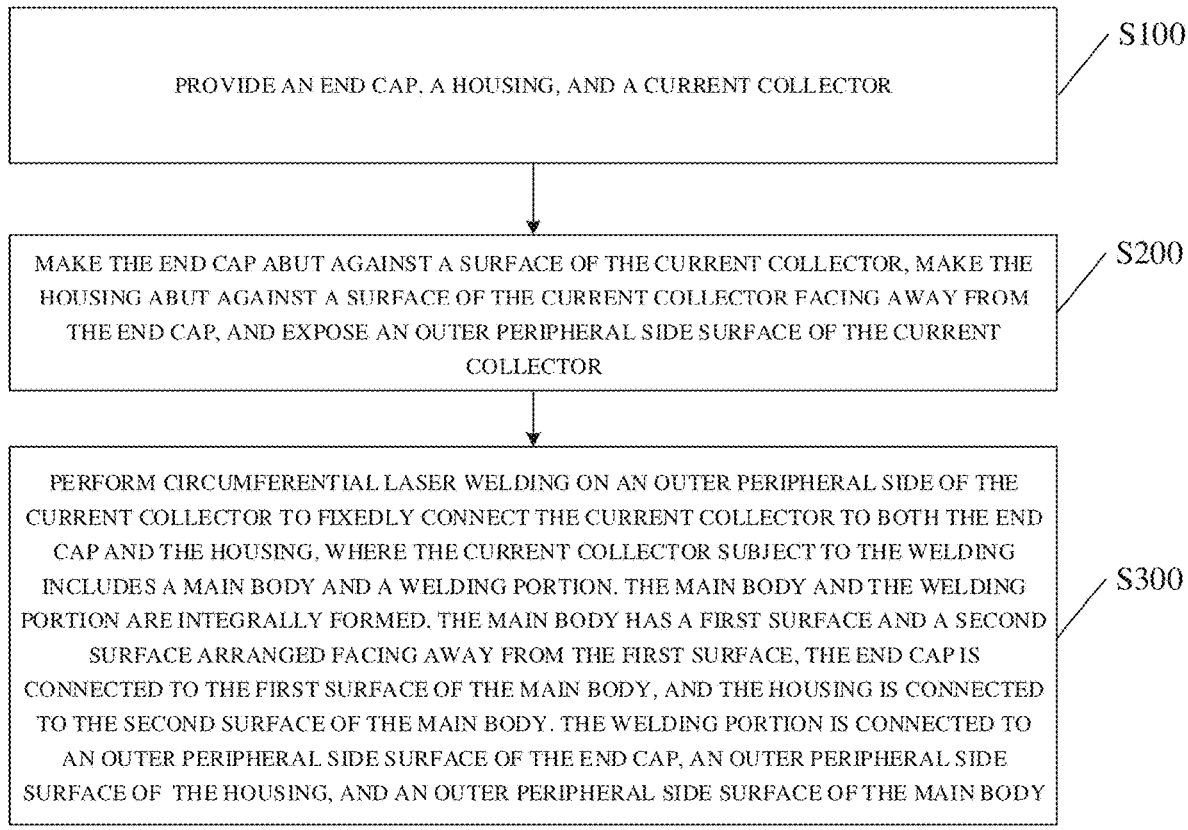
FIG. 24 is a process flow chart of a welding method for an energy storage device provided in an embodiment of the disclosure.

Reference is made to FIG. 1 to FIG. 22, and FIG. 24. FIG. 24 is a process flow chart of a welding method for an energy storage device provided in an embodiment of the disclosure. The disclosure further provides a welding method for the energy storage device 1, where the welding method includes operations at S100, S200, and S300. Detailed illustrations of the operations at S100, S200, and S300 are illustrated as follows. The welding method includes the following.

At S100, provide an end cap 11, a housing 12, and a current collector 13.

Optionally, an electrode assembly 14 is further provided. Further, optionally, the electrode assembly 14 has a winding shape. Optionally, the electrode assembly 14 has a winding shape and has a hollow structure 141, and the current collector 13 includes a second positioning portion 138.

First, the wound electrode assembly 14 is placed inside the housing 12, and a tab of the electrode assembly 14 is exposed through an opening of the housing 12. Second, the current collector 13 is mounted to the electrode assembly 14. Specifically, the current collector 13 is positioned on the tab of the wound electrode assembly 14. Then, a welding process is performed on the current collector 13 and the tab. Specifically, the positive current collector 13 is welded to the tab by laser penetration welding. For example, a melt width of welding ranges from 1 mm to 2 mm, and a melt depth of welding ranges from 2 mm to 4 mm.

Optionally, in the operation of mounting the current collector 13 to the electrode assembly 14, at least part of the second positioning portion 138 is inserted into the hollow structure 141.

At S200, make the end cap 11 abut against a surface of the current collector 13, make the housing 12 abut against a surface of the current collector 13 facing away from the end cap 11, and expose an outer peripheral side surface of the current collector 13.

Optionally, a first positioning portion 134 is arranged on the current collector 13, where the first positioning portion 134 is arranged at one of two opposite sides of the current collector 13, and the second positioning portion 138 is arranged at the other of the two opposite sides of the current collector 13. The end cap 11 includes a first portion 113 and a second portion 114, and the second portion 114 is connected to a periphery of the first portion 113 in a bending manner.

Optionally, in the operation S200 of making the end cap 11 abut against the surface of the current collector 13, an inner peripheral side surface of the second portion 114 abuts against an outer peripheral side surface of the first positioning portion 134. It may be understood that, the end cap 11 is sleeved on the top of the current collector 13, and the end cap 11 covers an outer peripheral surface of the first positioning portion 134.

At S300, perform circumferential laser welding on an outer peripheral side of the current collector 13 to fixedly connect the current collector 13 to both the end cap 11 and the housing 12, where the current collector 13 subject to the welding includes a main body 131 and a welding portion 132. The main body 131 and the welding portion 132 are integrally formed. The main body 131 has a first surface 131a and a second surface 131b facing away from the first surface 131a. The end cap 11 is connected to the first surface 131a of the main body 131, and the housing 12 is connected to the second surface 131b of the main body 131. The welding portion 132 is connected to an outer peripheral side surface of the end cap 11, an outer peripheral side surface of the housing 12, and an outer peripheral side surface of the main body 131.

Specifically, the end cap 11, the current collector 13, and the housing 12 are placed horizontally and clamped by a welding fixture, and a laser welding head is adjusted to be aligned with the outer peripheral side surface of the current collector 13. Then, the laser welding head is started and the fixture is rotated at a constant speed, and a side sealing welding is completed after the fixture is rotated by a full turn. Specific structure of the energy storage device 1 after welding is as mentioned above, which will not be repeated herein.

The welding method for the energy storage device 1 provided in the embodiment is simple and easy to operate. The current collector 13 is arranged between the end cap 11 and the housing 12, and by means of performing welding once, the current collector 13 is welded to both the peripheral side surface of the end cap 11 and the peripheral side surface of the housing 12 to realize side sealing welding. In this way, the welding region between the end cap 11 and the current collector 13 may be enlarged, thereby improving the current-flow through capability between the end cap 11 and the current collector 13, and accordingly improving the strength of connection among the end cap 11, the current collector 13, and the housing 12.

Figure 25:
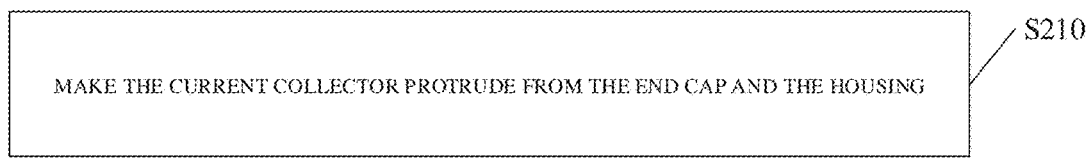
FIG. 25 is a process flow chart of a welding method for an energy storage device provided in another embodiment of the disclosure.

Reference is made to FIG. 13 and FIG. 25. FIG. 25 is a process flow chart of a welding method for an energy storage device provided in another embodiment of the disclosure. In an embodiment, the operation of exposing the outer peripheral side surface of the current collector 13 at S200 may include the following.

At S210, make the current collector 13 protrude from the end cap 11 and the housing 12.

Specifically, the end cap 11, the current collector 13, and the housing 12 are placed horizontally and clamped by the welding fixture, and the laser welding head is adjusted to be aligned with a welding convex ring of the current collector 13 that protrudes from both a side wall surface of the end cap 11 and a side wall surface of the housing 12. A welding portion 132 of the energy storage device 1 obtained through the welding method of the disclosure may be understood as a melted welding convex ring after welding.

Before welding the current collector 13, the end cap 11, and the housing 12 together, the current collector 13 may be arranged protruding from the end cap 11 and the housing 12. It may be understood that, the current collector 13 has a welding convex ring protruding from both the outer side wall of the end cap 11 and the outer side wall of the housing 12, where the welding convex ring is used for welding. In this way, it is conducive to aligning the laser welding head with the welding convex ring to directly heat the welding convex ring, then the housing 12 is rotated at a constant speed to complete a welding. In this case, the welding convex ring is firstly heated and melted to achieve "top melting". That is, the welding convex ring melted flows to two sides under the action of gravity, to fill the gap between the end cap 11 and the current collector 13 or the gap between the housing 12 and the current collector 13, then the welding convex ring melted is fused together with the end cap 11 and the housing 12 that are melted subsequently, thereby further enhancing the structural strength and airtightness of the welding region. It may also be understood that, the welding convex ring may be melted to a solder. In addition, due to the effect of "top melting" of the welding convex ring, requirements for the machining precision of a joint surface of the end cap 11 and a joint surface of the housing 12 are reduced, and thus the manufacturing cost of components of the energy storage device 1 is further reduced.

As illustrated in FIG. 13, in an embodiment, in the operation of exposing the outer peripheral side surface of the current collector 13 at S200, that is, in the operation of making the current collector 13 protrude from both the end cap 11 and the housing 12 at S210, the current collector 13 protrudes from both the end cap 11 and the housing 12 by a width L3, and the width L3 satisfies: 0.25 mm≤L3≤2 mm.

Before welding the current collector 13, the end cap 11, and the housing 12 together, the current collector 13 protrudes from the end cap 11 and the housing 12 by the width L3, and the width L3 satisfies: 0.25 mm≤L3≤2 mm. It may be understood that, the welding convex ring protrudes from the end cap 11 and the housing 12 by the width L3, and the width L3 satisfies: 0.25 mm≤L3≤2 mm. The width L3 refers to a distance from an outer peripheral side wall of the current collector 13 to an outer peripheral side wall of the end cap 11, or a distance from the outer peripheral side wall of the current collector 13 to an outer peripheral side wall of the housing 12. Specifically, the width L3 may be equal to but is not limited to 0.25 mm, 0.3 mm, 0.35 mm, 0.4 mm, 0.45 mm, 0.5 mm, 0.55 mm, 0.6 mm, 0.65 mm, 0.7 mm, 0.75 mm, 0.8 mm, 0.85 mm, 0.9 mm, 0.95 mm, 1 mm, 1.1 mm, 1.2 mm, 1.3 mm, 1.4 mm, 1.5 mm, 1.6 mm, 1.7 mm, 1.8 mm, 1.9 mm, 2 mm, etc.

In the embodiment, in the case where the width L3 satisfies 0.25 mm≤L3≤2 mm, not only requirements for the machining precision of the joint surface of the end cap 11 and the joint surface of the housing 12 may be reduced and the structural strength and airtightness of the welding region may be enhanced, but also the time for welding may be reduced, the efficiency of welding may be improved, and the manufacturing cost may be reduced. In the case where the width L3 is too small, it is not conducive to aligning the laser welding head with the welding convex ring, and thus requirements for the machining precision of the joint surface of the end cap 11 and the joint surface of the housing 12 may be increased. Further, in this case, it is not conducive to welding the end cap 11 and the housing 12 using the melted welding convex ring, and thus the structural strength and airtightness of the welding region may be reduced. In the case where the width L3 is too large, the time for welding may be increased, thus reducing the welding efficiency and increasing the manufacturing cost.

The contents of the embodiments of the disclosure are described in detail. Principles and embodiments of the disclosure are elaborated and described herein. The illustration mentioned above is only used to help understanding of methods and core ideas of the disclosure. Meanwhile, those of ordinary skill in the art my make changes to the specific embodiments and application scopes according to ideas of the disclosure. In summary, contents of this specification should not be understood as limitation on the present disclosure.

What is claimed is:

1. An energy storage device, comprising:
   an end cap;
   a housing; and
   a current collector arranged between the end cap and the housing, wherein
   an outer peripheral side surface of the end cap is flush with an outer peripheral side surface of the housing;
   the current collector comprises a main body and a welding portion, the main body and the welding portion are integrally formed, the main body has a first surface and a second surface facing away from the first surface, the end cap is connected to the first surface of the main body, the housing is connected to the second surface of the main body, and the welding portion is connected to the outer peripheral side surface of the end cap, the outer peripheral side surface of the housing, and an outer peripheral side surface of the main body;
   the current collector satisfies one of the following: the outer peripheral side surface of the main body is flush with both the outer peripheral side surface of the end cap and the outer peripheral side surface of the housing, in a radial direction of the current collector; and the outer peripheral side surface of the main body protrudes from both the outer peripheral side surface of the end cap and the outer peripheral side surface of the housing, in the radial direction of the current collector; and
   the welding portion protrudes from the end cap by a width L1, wherein the width L1 satisfies: 0.05 mm≤L1≤1.45 mm; and the welding portion protrudes from the housing by a width L2, wherein the width L2 satisfies: 0.05 mm≤L2≤1.45 mm.

2. The energy storage device of claim 1, wherein a first positioning portion protrudes from the first surface of the main body, an outer peripheral side surface of the first positioning portion is spaced apart from the outer peripheral side surface of the main body, the end cap comprises a first portion and a second portion, the second portion is connected to a periphery of the first portion in a bending manner, a surface of the second portion close to the main body is connected to the first surface, and an inner peripheral side surface of the second portion abuts against the outer peripheral side surface of the first positioning portion.

3. The energy storage device of claim 2, wherein an end of the first positioning portion facing away from the main body is spaced apart from a surface of the first portion facing the main body.

4. The energy storage device of claim 2, wherein the first positioning portion has a first top surface and a first side surface, the first top surface faces away from the first surface, the first side surface is connected to the first top surface in a bending manner, the first side surface is further connected to the first surface, and a connection between the first top surface and the first side surface has an arc chamfer.

5. The energy storage device of claim 2, wherein the first positioning portion comprises a positioning convex ring arranged in a circumferential direction of the second portion.

6. The energy storage device of claim 2, wherein the first positioning portion comprises a plurality of positioning protrusions spaced apart from each other.

7. The energy storage device of claim 6, wherein each of the plurality of positioning protrusions is inclined towards a central axis of the main body, and an included angle α between the first surface and an outer peripheral side surface of each of the plurality of positioning protrusions facing away from the central axis of the main body satisfies: 80°≤α≤85°.

8. The energy storage device of claim 7, wherein the main body defines a plurality of first through holes penetrating through both the first surface and the second surface.

9. The energy storage device of claim 8, wherein at least one first through hole and at least one positioning protrusion that is connected to an inner side wall of the first through hole cooperatively form a first folding group, and the first folding group and the main body are integrally formed by a stamping process.

10. The energy storage device of claim 1, wherein a plurality of limiting protrusions are arranged spaced apart from each other on the first surface of the main body, an outer peripheral side surface of each of the plurality of limiting protrusions is spaced apart from the outer peripheral side surface of the main body, the end cap comprises a first portion and a second portion, the second portion is connected to a periphery of the first portion in a bending manner, a surface of the second portion close to the main body is connected to the first surface, and a surface of each of the plurality of limiting protrusions facing away from the main body abuts against a surface of the first portion facing the main body.

11. The energy storage device of claim 1, further comprising an electrode assembly, wherein the housing defines an accommodating cavity, the electrode assembly is arranged in the accommodating cavity, the electrode assembly has a winding shape and has a hollow structure, a second positioning portion is arranged on the second surface of the main body, and at least part of the second positioning portion is inserted into the hollow structure.

12. The energy storage device of claim 11, wherein the main body defines a first liquid-injection hole penetrating through both the first surface and a side of the second positioning portion facing away from the end cap, an orthographic projection of the first liquid-injection hole on a surface of the electrode assembly facing the current collector falls within the hollow structure, the end cap defines a second liquid-injection hole, the end cap and the current collector cooperatively define a cavity, and the first liquid-injection hole and the second liquid-injection hole are both in communication with the cavity.

13. An electricity-consumption device, comprising:
    a device body; and
    an energy storage device, the energy storage device being configured to power the device body and comprising:
       an end cap;
       a housing; and
       a current collector arranged between the end cap and the housing, wherein
          an outer peripheral side surface of the end cap is flush with an outer peripheral side surface of the housing;
          the current collector comprises a main body and a welding portion, the main body and the welding portion are integrally formed, the main body has a first surface and a second surface facing away from the first surface, the end cap is connected to the first surface of the main body, the housing is connected to the second surface of the main body, and the welding portion is connected to the outer peripheral side surface of the end cap, the outer peripheral side surface of the housing, and an outer peripheral side surface of the main body;

the current collector satisfies one of the following: the outer peripheral side surface of the main body is flush with both the outer peripheral side surface of the end cap and the outer peripheral side surface of the housing, in a radial direction of the current collector; and the outer peripheral side surface of the main body protrudes from both the outer peripheral side surface of the end cap and the outer peripheral side surface of the housing, in the radial direction of the current collector; and the welding portion protrudes from the end cap by a width L1, wherein the width L1 satisfies: 0.05 mm≤L1≤1.45 mm; and the welding portion protrudes from the housing by a width L2, wherein the width L2 satisfies: 0.05 mm≤L2≤1.45 mm.

14. The electricity-consumption device of claim 13, wherein a first positioning portion protrudes from the first surface of the main body, an outer peripheral side surface of the first positioning portion is spaced apart from the outer peripheral side surface of the main body, the end cap comprises a first portion and a second portion, the second portion is connected to a periphery of the first portion in a bending manner, a surface of the second portion close to the main body is connected to the first surface, and an inner peripheral side surface of the second portion abuts against the outer peripheral side surface of the first positioning portion.

15. The electricity-consumption device of claim 14, wherein an end of the first positioning portion facing away from the main body is spaced apart from a surface of the first portion facing the main body.

16. The electricity-consumption device of claim 14, wherein the first positioning portion has a first top surface and a first side surface, the first top surface faces away from the first surface, the first side surface is connected to the first top surface in a bending manner, the first side surface is further connected to the first surface, and a connection between the first top surface and the first side surface has an arc chamfer.

17. The electricity-consumption device of claim 14, wherein the first positioning portion comprises a positioning convex ring arranged in a circumferential direction of the second portion.

18. The electricity-consumption device of claim 14, wherein the first positioning portion comprises a plurality of positioning protrusions spaced apart from each other.

19. A welding method for an energy storage device, comprising:

providing an end cap, a housing, and a current collector;

making the end cap abut against a surface of the current collector, make the housing abut against a surface of the current collector facing away from the end cap, and exposing an outer peripheral side surface of the current collector; and performing circumferential laser welding on an outer peripheral side of the current collector to fixedly connect the current collector to both the end cap and the housing, wherein the current collector subject to the circumferential laser welding comprises a main body and a welding portion, the main body and the welding portion are integrally formed, the main body has a first surface and a second surface facing away from the first surface, the end cap is connected to the first surface of the main body, the housing is connected to the second surface of the main body, the welding portion is connected to an outer peripheral side surface of the end cap, an outer peripheral side surface of the housing, and an outer peripheral side surface of the main body;

the outer peripheral side surface of the end cap is flush with the outer peripheral side surface of the housing;

the current collector satisfies one of the following: the outer peripheral side surface of the main body is flush with both the outer peripheral side surface of the end cap and the outer peripheral side surface of the housing, in a radial direction of the current collector; and the outer peripheral side surface of the main body protrudes from both the outer peripheral side surface of the end cap and the outer peripheral side surface of the housing, in the radial direction of the current collector; and the welding portion protrudes from the end cap by a width L1, wherein the width L1 satisfies: 0.05 mm≤L1≤1.45 mm; and the welding portion protrudes from the housing by a width L2, wherein the width L2 satisfies: 0.05 mm≤L2≤1.45 mm.

20. The welding method of claim 19, wherein exposing the outer peripheral side surface of the current collector, comprises:

the current collector protrudes from the end cap and the housing by a width L3, wherein the width L3 satisfies: 0.25 mm≤L3≤2 mm.

* * * * *